(12) United States Patent
Song et al.

(10) Patent No.: US 10,978,735 B2
(45) Date of Patent: Apr. 13, 2021

(54) STRETCHABLE POLYMER ELECTROLYTE, STRETCHABLE ELECTRODE, STRETCHABLE POLYMER, ELECTROCHEICAL DEVICE, AND METHOD OF PREPARING STRETCHABLE POLYMER

(71) Applicants: Samsung Electronics Co., Ltd., Suwon-si (KR); THE BOARD OF TRUSTEES OF THE LELAND STANFORD JUNIOR UNIVERSITY, Stanford, CA (US)

(72) Inventors: Minsang Song, Suwon-si (KR); Yongming Sun, Stanford, CA (US); Jeffrey Lopez, Stanford, CA (US); Yi Cui, Stanford, CA (US); Zhenan Bao, Stanford, CA (US)

(73) Assignees: SAMSUNG ELECTRONICS CO., LTD., Gyeonggi-Do (KR); THE BOARD OF TRUSTEES OF THE LELAND STANFORD JUNIOR UNIVERSITY, Stanford, CA (US)

( * ) Notice: Subject to any disclaimer, the term of this patent is extended or adjusted under 35 U.S.C. 154(b) by 153 days.

(21) Appl. No.: 16/162,494

(22) Filed: Oct. 17, 2018

(65) Prior Publication Data
US 2019/0229371 A1    Jul. 25, 2019

Related U.S. Application Data

(60) Provisional application No. 62/620,845, filed on Jan. 23, 2018.

(30) Foreign Application Priority Data

May 15, 2018 (KR) ................ 10-2018-0055650

(51) Int. Cl.
*H01M 10/0565* (2010.01)
*H01M 10/0525* (2010.01)
(Continued)

(52) U.S. Cl.
CPC ......... *H01M 10/0565* (2013.01); *C08L 77/06* (2013.01); *H01M 4/13* (2013.01);
(Continued)

(58) Field of Classification Search
CPC ......... H01M 10/0525; H01M 10/0565; H01M 10/0569; H01M 10/0568; C08L 77/06; C08L 2203/20
See application file for complete search history.

(56) References Cited

U.S. PATENT DOCUMENTS 5,280,053 A    1/1994   Dearlove et al.
6,562,520 B1   5/2003   Zhao et al.
(Continued)

FOREIGN PATENT DOCUMENTS

JP    2001332306 A    11/2001
JP    2015079742 A    4/2015
(Continued)

OTHER PUBLICATIONS

Sheng Xu et al., "Stretchable batteries with self-similar serpentine interconnects and integrated wireless recharging systems", Nature Communications, DOI: 10.1038/ncomms2553, Published Feb. 26, 2013, pp. 1-8.
(Continued)

*Primary Examiner* — Osei K Amponsah
(74) *Attorney, Agent, or Firm* — Cantor Colburn LLP

(57) ABSTRACT

A stretchable polymer electrolyte includes a stretchable copolymer; a lithium salt; and an organic liquid, wherein the stretchable copolymer includes a non-crosslinked first repeating unit, a non-crosslinked second repeating unit, and
(Continued)

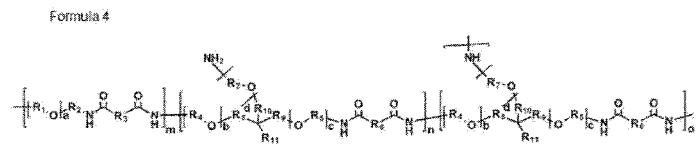

Formula 4

Formula 5

Formula 6 a crosslinked third repeating unit, the first repeating unit includes a first hard segment and a first soft segment, the second repeating unit includes a second hard segment and a second soft segment, and the third repeating unit includes a third hard segment and a third soft segment.

18 Claims, 9 Drawing Sheets

(51) Int. Cl.
<table>
<tr><td>H01M 10/0569</td><td>(2010.01)</td></tr>
<tr><td>H01M 10/0568</td><td>(2010.01)</td></tr>
<tr><td>C08L 77/06</td><td>(2006.01)</td></tr>
<tr><td>H01M 10/052</td><td>(2010.01)</td></tr>
<tr><td>H01M 4/36</td><td>(2006.01)</td></tr>
<tr><td>H01M 4/13</td><td>(2010.01)</td></tr>
</table>

(52) U.S. Cl.
CPC ......... *H01M 4/364* (2013.01); *H01M 10/052* (2013.01); *H01M 10/0525* (2013.01); *H01M 10/0568* (2013.01); *H01M 10/0569* (2013.01); *C08L 2203/20* (2013.01); *H01M 2300/0025* (2013.01); *H01M 2300/0082* (2013.01)

(56) References Cited

U.S. PATENT DOCUMENTS

<table>
<tr><td>9,548,514 B2</td><td>1/2017</td><td>Kyu et al.</td></tr>
<tr><td>2004/0127621 A1</td><td>7/2004</td><td>Drzal et al.</td></tr>
<tr><td>2006/0177718 A1*</td><td>8/2006</td><td>Fuller .................. H01B 1/122<br>429/482</td></tr>
<tr><td>2015/0094448 A1</td><td>4/2015</td><td>Banister et al.</td></tr>
<tr><td>2016/0204468 A1</td><td>7/2016</td><td>Makino et al.</td></tr>
</table>

FOREIGN PATENT DOCUMENTS

<table>
<tr><td>KR</td><td>101687588 B1</td><td>12/2016</td></tr>
<tr><td>WO</td><td>1996014362 A1</td><td>5/1996</td></tr>
<tr><td>WO</td><td>2015046313 A1</td><td>4/2015</td></tr>
</table>

OTHER PUBLICATIONS

Wei Liu et al., "3D Porous Sponge-Inspired Electrode for Stretchable Lithium-Ion Batteries", Advanced Materials, Mar. 15, 2016, vol. 28, pp. 3578-3583.

Wei Weng et al., "A Gum-Like Lithium-Ion Battery Based on a Novel Arched Structure", Advanced Materials, Jan. 12, 2015, vol. 27, pp. 1363-1369.

* cited by examiner

Formula 4

Formula 5

Formula 6

Formula 7

Formula 8

STRETCHABLE POLYMER ELECTROLYTE, STRETCHABLE ELECTRODE, STRETCHABLE POLYMER, ELECTROCHEICAL DEVICE, AND METHOD OF PREPARING STRETCHABLE POLYMER

CROSS-REFERENCE TO RELATED APPLICATION

This application claims the benefit of and priority to U.S. Provisional Patent Application No. 62/620,845, filed on Jan. 23, 2018, in the U.S. Patent and Trademark Office, and Korean Patent Application No. 10-2018-0055650, filed on May 15, 2018, in the Korean Intellectual Property Office, and all the benefits accruing therefrom under 35 U.S.C. § 119, the disclosures of which are incorporated herein in their entirety by reference.

BACKGROUND

1. Field

The present disclosure relates to a stretchable polymer electrolyte, a stretchable electrode, a stretchable copolymer, an electrochemical device, and a method of preparing a stretchable copolymer.

2. Description of the Related Art

The market for wearable electronic devices is growing, largely due to the development of technology in the field of electronics. The wearable electronic device is flexible and thus can be contracted after elongation. As the market for wearable electronic devices continues to grow, a demand for batteries suitable for driving wearable electronic devices has increased.

The separator and electrodes used in a conventional secondary battery may be bent, however, the conventional separator has a high elastic modulus and it is difficult for it to be stretched. The conventional electrode includes a metal current collector and thus can be hardly elongated and is almost impossible to be contracted after elongation. Therefore, it is difficult to apply the conventional battery technology including the separator and the electrode to the wearable electronic device, especially when stretching and flexibility are necessary.

Accordingly, a battery, which can be contracted as well as stretched, together with a polymer electrolyte and an electrode that also can be contracted as well as stretched, remain desirable objectives.

SUMMARY

Provided is an electrochemically stable stretchable polymer electrolyte.

Provided is an electrochemically stable stretchable electrode.

Provided is a novel stretchable copolymer.

Provided is an electrochemical device including the stretchable polymer electrolyte, the stretchable electrode, or the stretchable copolymer.

Provided is a method of preparing the stretchable copolymer.

Additional aspects will be set forth in part in the description which follows and, in part, will be apparent from the description, or may be learned by practice of the presented embodiments.

According to an aspect, a stretchable polymer electrolyte includes a stretchable copolymer; a lithium salt; and an organic liquid, wherein the stretchable copolymer includes a non-crosslinked first repeating unit, a non-crosslinked second repeating unit, and a crosslinked third repeating unit, the first repeating unit includes a first hard segment and a first soft segment, the second repeating unit includes a second hard segment and a second soft segment, and the third repeating unit includes a third hard segment and a third soft segment.

According to another embodiment, a stretchable electrode includes a stretchable copolymer; and an electrode active material, wherein the stretchable copolymer includes a non-crosslinked first repeating unit, a non-crosslinked second repeating unit, and a crosslinked third repeating unit, the first repeating unit includes a first hard segment and a first soft segment, the second repeating unit includes a second hard segment and a second soft segment, and the third repeating unit includes a third hard segment and a third soft segment.

According to an aspect of another embodiment, a stretchable copolymer includes a non-crosslinked first repeating unit, a non-crosslinked second repeating unit, and a crosslinked third repeating unit, the first repeating unit includes a first hard segment and a first soft segment, the second repeating unit includes a second hard segment and a second soft segment, and the third repeating unit includes a third hard segment and a third soft segment.

In an embodiment, the stretchable copolymer is represented by Formula 4:

Formula 4

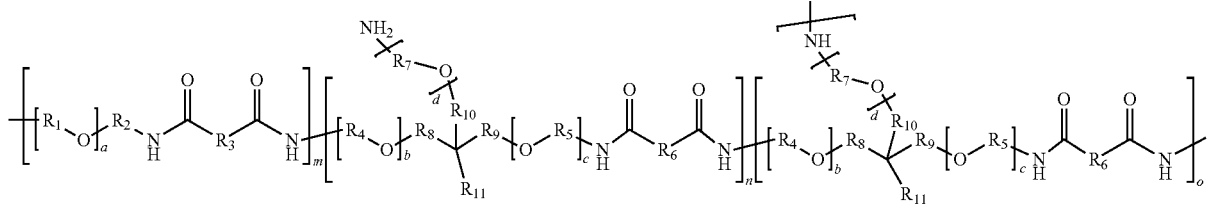

wherein each $R_1$, $R_2$, $R_3$, $R_4$, $R_5$, $R_6$, $R_7$, $R_8$, $R_9$, and $R_{10}$ are the same or different, and are each independently a divalent linking group, wherein the divalent linking group includes a linear or branched C2-C10 alkylene group substituted or not substituted with a halogen, a C6-C10 arylene group substituted or not substituted with a halogen, a C2-C10 heteroarylene group substituted or not substituted with a halogen, or a combination thereof; each $R_{11}$ is the same or different, and is a monovalent group, wherein the monovalent group includes a linear or branched C1-C10 alkyl group substituted or not substituted with a halogen, a C2-C10 alkenyl group substituted or not substituted with a halogen, a C2-C10 alkynyl group substituted or not substituted with a halogen, a C6-C10 cycloalkyl group substituted or not substituted with a halogen, a C6-C10 aryl group substituted or not substituted with a halogen, a C2-C10 heteroaryl group substituted or not substituted with a halogen, or a combination thereof; a, b, c, and d are each independently an integer of 2 to 20; m, n, and o are molar fractions that satisfy 0<m<1, 0<n<1, 0<o<1, m+n+o=1, and a molar ratio n:o is in a range of about 9:1 to about 5:5; and a molecular weight between crosslinks is in a range of about 6,000 Dalton to about 500,000 Dalton.

According to an aspect of another embodiment, an electrochemical device includes at least one selected from a stretchable polymer electrolyte comprising a stretchable copolymer; a lithium salt; and an organic liquid, wherein the stretchable copolymer comprises a non-crosslinked first repeating unit, a non-crosslinked second repeating unit, and a crosslinked third repeating unit; the first repeating unit comprises a first hard segment and a first soft segment; the second repeating unit comprises a second hard segment and a second soft segment; and the third repeating unit comprises a third hard segment and a third soft segment; a stretchable electrode including the stretchable copolymer and an electrode active material; and the stretchable copolymer.

According to an aspect of another embodiment, a method of preparing a stretchable copolymer includes reacting a first monomer including at least two reactive terminal functional groups and a chain extender including an alkylene oxide repeating unit to prepare a first pre-copolymer; combining the first pre-copolymer and a second monomer including a crosslinking terminal functional group to prepare a second pre-copolymer composition; and crosslinking the second pre-copolymer composition to provide the stretchable copolymer.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
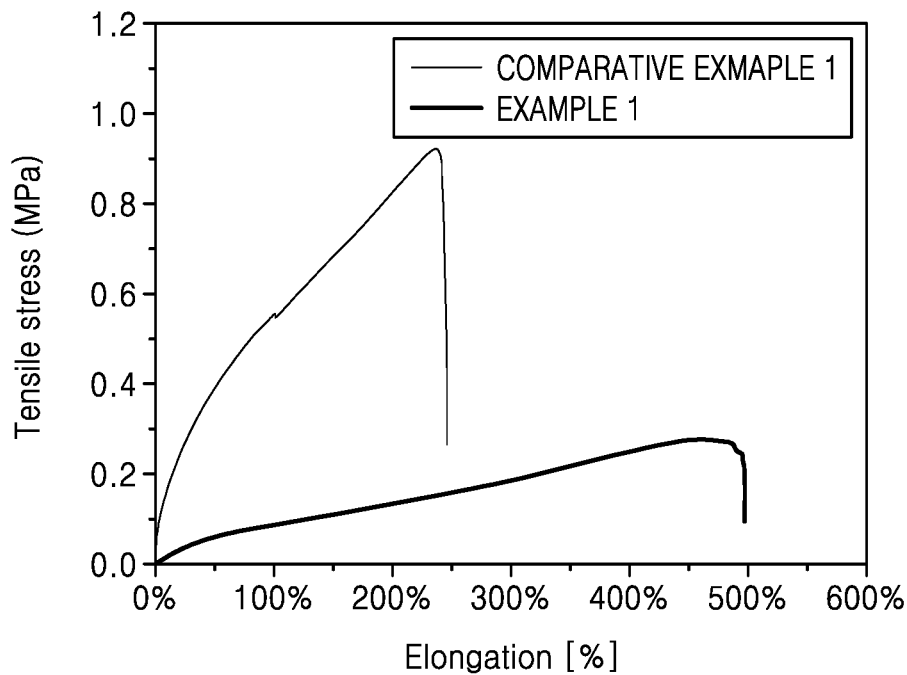
FIG. 1 is a graph of tensile stress (megapascal, MPa) versus elongation (percent, %) and shows a stress-strain curve of stretchable copolymers prepared in Example 1 and Comparative Example 1.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. "Or" means "and/or." The singular forms "a," "an," and "the" are intended to include the plural forms. Expressions such as "at least one of," when preceding a list of elements, modify the entire list of elements and do not modify the individual elements of the list.

The terms used in the present specification are merely used to describe particular embodiments, and are not intended to be limiting the present inventive concept. An expression used in the singular forms "a," "an," and "the" encompasses the expression of the plural, including "at least one," unless it has a clearly different meaning in the context provided. In the present specification, it is to be understood that the terms such as "includes" and/or "including," "haves" and/or "having," and "comprises" and/or "comprising" are intended to indicate the existence of the stated features, numbers, steps, actions, components, parts, and/or combinations thereof disclosed in the specification, and are not intended to preclude the possibility that one or more other features, numbers, steps, actions, components, parts, and/or combinations thereof may exist or may be added. As used herein, "/" may be interpreted as "and" or "or" depending on the situation.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

In order to clearly illustrate various components, layers, and regions in the drawings, diameters, lengths, and thicknesses may be exaggerated or reduced. Throughout the specification, like reference numerals may denote like elements in the drawings. It will be understood that, throughout the specification, when a layer, a film, or a plate is referred to as being "on" or "above" another layer, film, or plate, it can be directly or indirectly formed on the other layer, film, or plate. That is, for example, intervening layers, films, or plates may be present therebetween. In contrast, when an element is referred to as being "directly on" another element, there are no intervening elements present. While such terms as "first," "second," etc., may be used herein to describe various elements, components, regions, layers, and/or sections, such elements, components, regions, layers, and/or sections must should not be limited to the above by these terms throughout the specification. These above terms are used only to distinguish one element, component, region, layer, or section from another element, component, region, layer, or section. Thus, "a first element," "component," "region," "layer," or "section" discussed below could be termed a second element, component, region, layer, or section without departing from the teachings herein. In the drawings, some of the elements may be omitted, but such omissions are not intended to exclude the omitted elements, but are intended to help understanding of the features of the present inventive concept.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined in the present specification.

Hereinafter, according to one or more embodiments, a stretchable copolymer, an electrode, and a lithium battery including the stretchable copolymer, and a method of preparing a stretchable copolymer will be described in detail.

As used herein, the term "non-crosslinked repeating unit" refers to a repeating unit that includes linking sites, each to be connected with another repeating unit, at the terminal ends in one repeating unit. For example, when the repeating unit includes two linking sites, the non-crosslinked repeating unit refers to a repeating unit that forms a linear polymer chain and does not form a crosslinking bond.

As used herein, the term "crosslinked repeating unit" refers to a repeating unit that includes a crosslinking site to be connected with another repeating unit other than both terminals in one repeating unit. For example, when the repeating unit includes three or more terminal linking sites, the crosslinked repeating unit refers to a repeating unit that includes a plurality of polymer chains arranged in different directions (i.e. in different chains) but linked to each other by a covalent bond at one site and thus forms a crosslinked polymer chain. The crosslinked repeating unit includes a crosslinking site in the repeating unit. The crosslinked repeating unit is different from a non-crosslinked repeating unit including a branched substituent. The branched substituent in the non-crosslinked repeating unit may not be linked to another polymer chain by an additional covalent bond.

As used herein, the term "crosslinking reaction" refers to a reaction that forms a crosslinking bond between polymers, or a network of polymer chains formed by linking one polymer chain with another polymer chain or polymer chains by one or more covalent bonds. As used herein, a crosslinking polymer is a product of the crosslinking reaction.

As used herein, the term "hard segment" refers to a polymer segment that includes a binding site, at which strong attractive force (or a stress) is applied between molecules, and thus is hard and has a low elasticity. A polymer formed of such binding site may have a high glass transition temperature, which may be generally about 80° C. or greater, and may be used in fibers. As used herein, the term "hard segment" refers to a segment that includes a binding site, at which weak attractive force (or a stress) is applied between molecules, and thus is flexible and highly elastic. A polymer formed of such binding site may have a low glass transition temperature, which may be generally about 40° C. or lower, and may be used in an electrolyte.

According to an embodiment, a stretchable polymer electrolyte includes a stretchable copolymer; a lithium salt, and an organic liquid, wherein the stretchable copolymer includes a non-crosslinked first repeating unit, a non-cross linked second repeating unit, and a crosslinked third repeating unit; the first repeating unit includes a first hard segment and a first soft segment; the second repeating unit includes a second hard segment and a second soft segment; and the third repeating unit includes a third hard segment and a third soft segment.

In the stretchable polymer electrolyte, when the non-crosslinked second repeating unit and/or the non-crosslinked first repeating unit that is derived from a chain extender or an extended linker are disposed between the crosslinked third repeating units of the stretchable copolymer, a crosslinking density of the stretchable copolymer decreases, and thus the stretchable polymer electrolyte may have an increased elongation at break of the stretchable copolymer and an excellent recovery. That is, when a molecular weight of a polymer chain disposed between the crosslinking sites increases, an elongation at break of the stretchable copolymer may improve. In some embodiments, when a soft segment is additionally disposed between the crosslinking sites, an elongation at break of the stretchable copolymer may improve. Thus, the stretchable polymer electrolyte including the stretchable copolymer may have both an excellent elongation at break and an excellent recovery.

In the stretchable copolymer in the stretchable polymer electrolyte, the first hard segment, the second hard segment, and the third hard segment may be the same or different, and may each independently include at least one selected from an amide bond, a urea bond, a urethane bond, and an imide bond. For example, the first hard segment and the second hard segment may each independently include at least one linking group selected from —NH—(C=O)—R—(C=O)—NH—, —O(C=O)—NH—R—NH—(C=O)O—, and

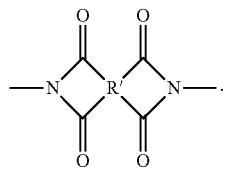

In these linking groups, R is a C1-C20 alkylene group substituted or not substituted with a substituent or a C6-C20 arylene group substituted or not substituted with a substituent; and R' is a tetravalent C1-C20 aliphatic group substituted or not substituted with a substituent or a tetravalent C6-C20 aromatic group substituted or not substituted with a substituent. When the stretchable copolymer includes a hard segment containing such bond or such linking group, the stretchable copolymer may have an excellent recovery.

In the stretchable copolymer in the stretchable polymer electrolyte, the first soft segment, the second soft segment, and the third soft segment may be the same or different, and may each independently include a poly(C1-20 alkylene oxide) chain. For example, the first soft segment and/or the second soft segment may include a non-crosslinked linear poly(C1-20 alkylene oxide) chain. When the second soft segment include a non-crosslinked linear poly(C1-C20 alkylene oxide) chain, the second repeating unit may be a non-crosslinked repeating unit. The third soft segment may include a crosslinked poly(C1-C20 alkylene oxide) chain. When the third soft segment includes a crosslinked poly(C1-C20 alkylene oxide) chain, the third repeating unit may be a crosslinked repeating unit. For example, the third soft segment may include a branched plurality of poly(C1-C20 alkylene oxide) chains. When the stretchable polymer includes a soft segment including the poly(C1-C20 alkylene oxide) chain, an elongation at break of the stretchable copolymer may improve.

In the stretchable copolymer in the stretchable polymer electrolyte, the first repeating unit may be represented by Formula 1, the second repeating unit may be represented by Formula 2, and the third repeating unit may be represented by Formula 3. When the stretchable copolymer includes the first repeating unit, the second repeating unit, and the third repeating unit having these structures, the stretchable copolymer may have both an excellent elongation at break and an excellent recovery.

In an embodiment, the first repeating unit may be represented by Formula 1:

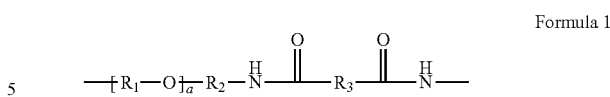

Formula 1

In Formula 1, $R_1$, $R_2$, and $R_3$ are each independently a divalent linking group, wherein the divalent linking group includes a linear or branched C2-C10 alkylene group substituted or not substituted with a halogen, a C6-C10 arylene group substituted or not substituted with a halogen, a C2-C10 heteroarylene group substituted with a halogen or not substituted, or a combination thereof; and a is an integer of 2 to 20.

In an embodiment, the second repeating unit may be represented by Formula 2, and the third repeating unit may be represented by Formula 3:

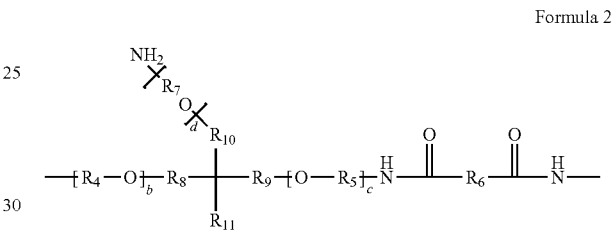

Formula 2

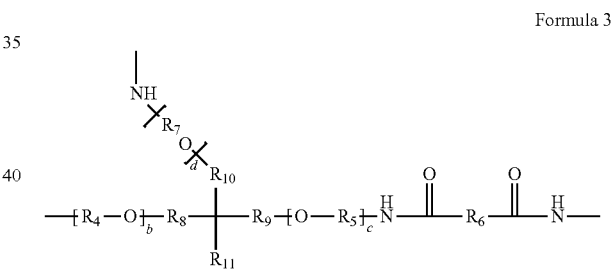

Formula 3

In Formulae 2 and 3, $R_4$, $R_5$, $R_6$, $R_7$, $R_8$, $R_9$, and $R_{10}$ are each independently a divalent linking group, wherein the divalent linking group includes a linear or branched C2-C10 alkylene group substituted or not substituted with a halogen, a C6-C10 arylene group substituted or not substituted with a halogen, a C2-C10 heteroarylene group substituted with a halogen or not substituted, or a combination thereof; $R_{11}$ is a monovalent linking group, which is a linear or branched C1-C10 alkyl group substituted or not substituted with a halogen, a C2-C10 alkenyl group substituted or not substituted with a halogen, a C2-C10 alkynyl group substituted or not substituted with a halogen, a C6-C10 cycloalkyl group substituted or not substituted with a halogen, a C6-C10 aryl group substituted or not substituted with a halogen, a C2-C10 heteroaryl group substituted or not substituted with a halogen, or a combination thereof; and b, c, and d are each independently a number of 2 to 20.

For example, the stretchable polymer in the stretchable polymer electrolyte may be represented by Formula 4:

Formula 4

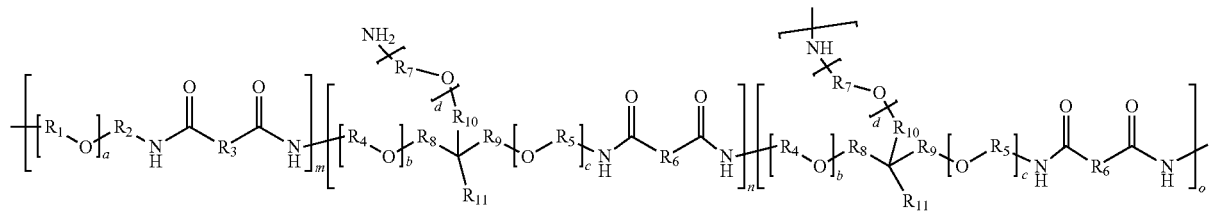

In Formula 4, each $R_1$, $R_2$, $R_3$, $R_4$, $R_5$, $R_6$, $R_7$, $R_8$, $R_9$, and $R_{10}$ are the same or different, and are each independently a divalent linking group, wherein the divalent linking group comprises a linear or branched C2-C10 alkylene group substituted or not substituted with a halogen, a C6-C10 arylene group substituted or not substituted with a halogen, a C2-C10 heteroarylene group substituted or not substituted with a halogen, or a combination thereof; each $R_{11}$ is the same or different, and is a monovalent group, wherein the monovalent group comprises a linear or branched C1-C10 alkyl group substituted or not substituted with a halogen, a C2-C10 alkenyl group substituted or not substituted with a halogen, a C2-C10 alkynyl group substituted or not substituted with a halogen, a C6-C10 cycloalkyl group substituted or not substituted with a halogen, a C6-C10 aryl group substituted or not substituted with a halogen, a C2-C10 heteroaryl group substituted or not substituted with a halogen, or a combination thereof; a, b, c, and d are each independently an integer of 2 to 20; and m, n, and o are molar fractions that satisfy $0<m<1$, $0<n<1$, $0<o<1$, and $m+n+o=1$, and a molar ratio of n:o is in a range of about 9:1 to about 5:5.

For example, each $R_3$ and $R_6$ may be the same or different, and may be each independently a propylene group, a butylene group, a pentylene group, a hexylene group, a heptylene group, or an octylene group. For example, $R_3$ and $R_6$ may have the same structure. For example, each $R_1$, $R_4$, $R_5$, and $R_7$ may be the same or different, and may be each independently an ethylene group, a propylene group, a butylene group, or a pentylene group. For example, $R_1$, $R_4$, $R_5$, and $R_7$ may have the same structure.

For example, the stretchable polymer in the stretchable polymer electrolyte may be represented by at least one of Formulae 5 and 6:

Formula 5

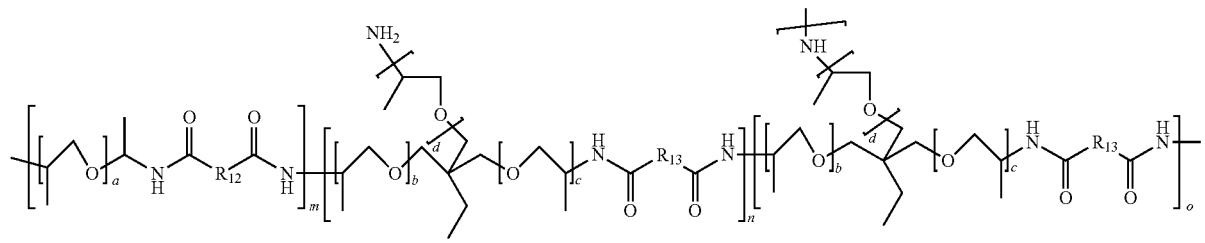

Formula 6

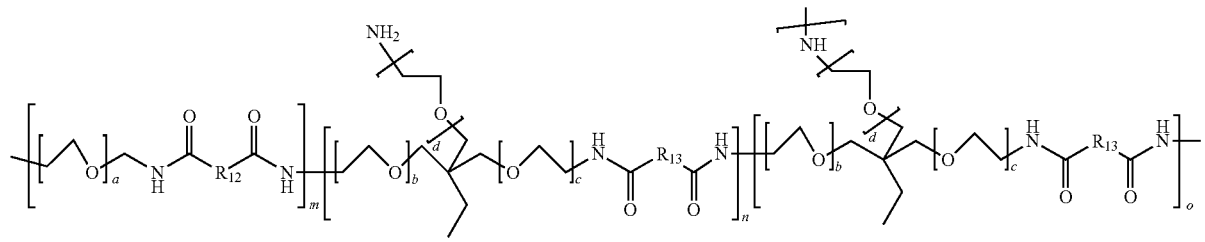

In Formulae 5 and 6, each $R_{12}$ and $R_{13}$ are the same or different, and are each independently a divalent linking group, wherein the divalent linking group comprises a linear or branched C2-C10 alkylene group substituted or not substituted with a halogen, a C6-C10 arylene group substituted or not substituted with a halogen, or a combination thereof; a, b, c, and d are each independently an integer of 2 to 20; m, n, and o are molar fractions that satisfy $0<m<1$, $0<n<1$, $0<o<1$, and $m+n+o=1$, and a molar ratio n:o is in a range of about 9:1 to about 5:5.

For example, the stretchable polymer in the stretchable polymer electrolyte may be represented by at least one of Formulae 7 and 8:

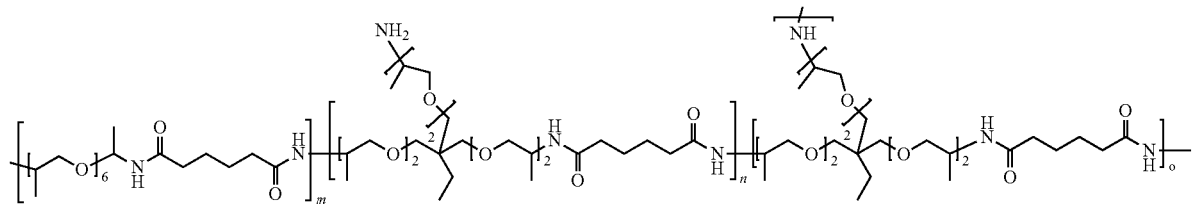

Formula 7

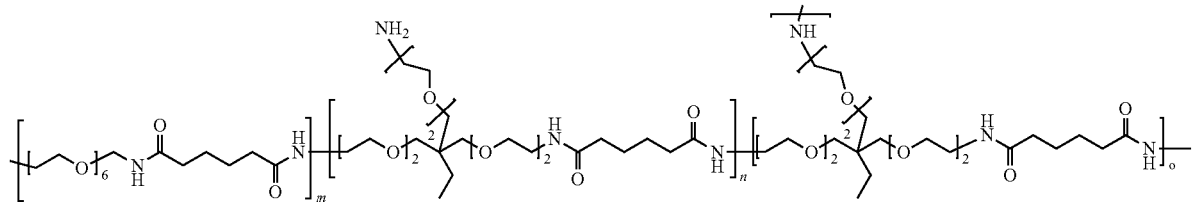

Formula 8

In Formulae 7 and 8, m, n, and o are molar fractions that satisfy 0<m<1, 0<n<1, 0<o<1, and m+n+o=1, and a molar ratio n:o is in a range of about 9:1 to about 5:5.

In an embodiment, an average molecular weight between crosslinks (Mc) of the stretchable copolymer may be in a range of about 6,000 to about 200,000 Dalton, about 6,500 to about 150,000 Dalton, about 7,000 to about 100,000 Dalton, about 7,500 to about 80,000 Dalton, about 8,000 to about 60,000 Dalton, about 8,500 to about 50,000 Dalton, about 9,000 to about 40,000 Dalton, about 9,500 to about 30,000 Dalton, about 9,500 to about 20,000 Dalton, or about 9,500 to about 15,000 Dalton.

In some embodiments, a weight average molecular weight (Mw) of the stretchable copolymer may be in a range of about 6,000 to about 500,000 Dalton, about 6,000 to about 200,000 Dalton, about 6,000 to about 150,000 Dalton, about 6,000 to about 100,000 Dalton, about 6,000 to about 80,000 Dalton, about 6,000 to about 60,000 Dalton, about 6,000 to about 50,000 Dalton, about 6,000 to about 40,000 Dalton, about 6,000 to about 30,000 Dalton, about 6,000 to about 20,000 Dalton, or about 6,000 to about 10,000 Dalton. When the molecular weight of the stretchable polymer is within these ranges, the stretchable polymer may have an improved elongation at break and improved recovery.

The stretchable polymer electrolyte includes a lithium salt. When the stretchable polymer electrolyte includes a lithium salt, the stretchable copolymer electrolyte may serve as an electrolyte.

An amount of the lithium salt in the stretchable polymer electrolyte may be in a range of about 1 part to about 100 parts by weight, about 2 parts to about 90 parts by weight, about 3 parts to about 80 parts by weight, about 4 parts to about 70 parts by weight, about 5 parts to about 60 parts by weight, about 6 parts to about 50 parts by weight, or about 7 parts to about 40 parts by weight, based on 100 parts by weight of the stretchable copolymer. When the amount of the lithium salt in the stretchable polymer electrolyte is within these ranges, an ion conductivity of the stretchable polymer electrolyte may improve. The lithium salt may include at least one selected from $LiPF_6$, $LiBF_4$, $LiAsF_6$, $LiClO_4$, $LiNO_3$, lithium bis(oxalato) borate (LiBOB), $LiCF_3SO_3$, $LiN(SO_2CF_3)_2$, $LiN(SO_2C_2F_5)_2$ (LiTFSI), $LiC(SO_2CF_3)_3$, $LiN(SO_3CF_3)_2$, $LiC_4F_9SO_3$, $LiAlCl_4$, and lithium trifluoromethanesulfonate (LiTfO), but embodiments are not limited thereto, and any suitable lithium salt that may be used in an electrolyte, including one in the art, may be used as the lithium salt.

The stretchable polymer electrolyte includes an organic liquid. When the stretchable polymer electrolyte includes an organic liquid, an ion conductivity of the stretchable polymer electrolyte may improve. The organic liquid may include at least one selected from an organic solvent and an ionic liquid.

The organic solvent may be an ether solvent or a carbonate solvent, but embodiments are not limited thereto, and any suitable material available as a solvent of a liquid electrolyte, including those in the art, and that is electrochemically stable with respect to lithium metal may be used as the organic solvent. For example, the organic solvent may be at least one selected from propylene carbonate, ethylene carbonate, fluoroethylene carbonate, vinylethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, dimethylacetamide, dimethylsulfoxide, dioxane, 1,2-dimethoxyethane, diethylene glycol dimethyl ether, sulfolane, dichloroethane, chlorobenzene, nitrobenzene, diethylene glycol, succinonitrile, and dimethyl ether, but embodiments are not limited thereto.

In some embodiments, the organic liquid includes an ionic liquid. For example, the organic liquid may include an ionic liquid that may be represented by at least one of Formula 9 or Formula 10:

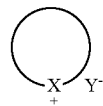

Formula 9

Formula 10

In Formula 9, the structure

denotes a 3-membered to 31-membered ring including 2 to 29 carbon atoms and at least one hetero atom, and such a ring may be a heterocycloalkyl ring or a heteroaryl ring, wherein X may be —N($R_2$)($R_3$)—, —N($R_2$)=, —P($R_2$), or —P($R_2$)($R_3$)—; and $Y^-$ is an anion.

In Formula 10, X may be —N($R_2$)($R_3$)($R_4$) or —P($R_2$)($R_3$)($R_4$); $R_{11}$ may be an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, an unsubstituted or substituted C3-C30 heterocycloalkyl group, or an unsubstituted or substituted C2-C100 alkyleneoxide group; and $Y^-$ is an anion.

In Formulae 9 and 10, $R_2$ and $R_3$ are each independently a hydrogen, a substituted or unsubstituted $C_1$-$C_{30}$ alkyl group, a substituted or unsubstituted $C_1$-$C_{30}$ alkoxy group, a substituted or unsubstituted $C_6$-$C_{30}$ aryl group, a substituted or unsubstituted $C_6$-$C_{30}$ aryloxy group, a substituted or unsubstituted $C_3$-$C_{30}$ heteroaryl group, a substituted or unsubstituted $C_3$-$C_{30}$ heteroaryloxy group, a substituted or unsubstituted $C_4$-$C_{30}$ cycloalkyl group, or a substituted or unsubstituted $C_3$-$C_{30}$ heterocycloalkyl group, or a substituted or unsubstituted $C_2$-$C_{100}$ alkyleneoxide group; and $Y^-$ may be at least one of $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $Cl^-$, $Br^-$, $I^-$, $C_2N_3^-$, $SCN^-$, $CF_3SO_3^-$, $(C_2F_6SO_2)_2N^-$, $(C_2F_5SO_2)(CF_3SO_2)N^-$, or $(CF_3SO_2)_2N^-$, $NO_3^-$, for example, at least one of $BF_4^-$, $Cl^-$, $Br^-$, $I^-$, $PF_6^-$, $ClO_4^-$, $CF_3SO_3^-$, $(CF_3SO_2)_2N^-$, $CF_3CO_2^-$, or $(C_2F_5SO_2)_2N^-$.

For example, the structure

in Formula 9 may be a cation represented by Formula 11:

Formula 11

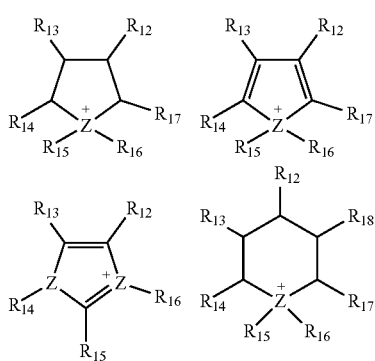

In Formula 11, Z represents N or P; and $R_{12}$ to $R_{18}$ are each independently a hydrogen atom, an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, an unsubstituted or substituted C3-C30 heterocycloalkyl group, or an unsubstituted or substituted C2-C100 alkyleneoxide group.

In an embodiment, the structure

in Formula 10 may be a cation represented by Formula 12:

Formula 12

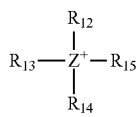

In Formula 12, Z represents N or P; and $R_{12}$ to $R_{15}$ are each independently a hydrogen atom, an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, an unsubstituted or substituted C3-C30 heterocycloalkyl group, or an unsubstituted or substituted C2-C100 alkylene oxide group.

For example, the ionic liquid may include at least one cation selected from an ammonium cation, an imidazolium cation, a piperidinium cation, a pyridinium cation, a pyrrolidinium cation, a phosphonium cation, and a sulfonium cation; and at least one anion selected from a bis(trifluoromethylsulfonyl)imide anion, a bromide anion, a chloride anion, a dicyanamide anion, a hexafluorophosphate anion, a phosphate anion, a sulfate anion, an iodide anion, a sulfonate anion, an amide anion, a sulfonimide anion, a nitrate anion, a tetrafluoroborate anion, a thiocyanate anion, and a triflate anion.

For example, the ionic liquid may be [emim]Cl/AlCl$_3$ (emim=ethyl methyl imidazolium), [bmpyr]NTf2 (bmpyr=butyl methyl pyridinium), [bpy]Br/AlCl$_3$ (bpy=4, 4'-bipyridine), [choline]Cl/CrCl$_3$.6H$_2$O, [Hpy(CH$_2$)$_3$pyH][NTf2]$_2$ (Hpy=pyH=1-hexylpyridinium, NTf$_2$=bis(trifluoromethanesulfon)imide), [emim]OTf/[hmim]I (hmim=hexyl methyl imidazolium), [choline]Cl/HOCH$_2$CH$_2$OH, [Et$_2$MeN(CH$_2$CH$_2$OMe)]BF$_4$ (Et=ethyl, Me=methyl, Pr=propyl, Bu=butyl, Ph=phenyl, Oct=octyl, and Hex=hexyl), [Bu$_3$PCH$_2$CH$_2$C$_8$F$_{17}$]OTf (OTf=trifluoromethane sulfonate), [bmim]PF$_6$ (bmim=butyl methyl imidazolium), [bmim]BF$_4$, [omim]PF$_6$ (omim=octyl methyl imidazolium), [Oct$_3$PC$_{18}$H$_{37}$]I, [NC(CH$_2$)$_3$mim]NTf$_2$ (mim=methyl imidazolium), [Pr$_4$N][B(CN)$_4$], [bmim]NTf$_2$, [bmim]Cl, [bmim][Me(OCH$_2$CH$_2$)$_2$OSO$_3$], [PhCH$_2$mim]OTf, [Me$_3$NCH(Me)CH(OH)Ph] NTf$_2$, [pmim][(HO)$_2$PO$_2$] (pmim=propyl methyl imidazolium), [(6-Me)bquin]NTf$_2$ (bquin=butyl quinolinium, [bmim][Cu$_2$Cl$_3$], [C$_{18}$H$_{37}$OCH$_2$mim]BF$_4$ (mim=methyl imidazolium), [heim]PF$_6$ (heim=hexyl ethyl imidazolium), [mim(CH$_2$CH$_2$O)$_2$CH$_2$CH$_2$mim][NTf$_2$]$_2$ (mim=methyl imidazolium), [obim]PF$_6$ (obim=octyl butyl imidazolium), [oquin]NTf$_2$ (oquin=octyl quinolinium), [hmim][PF$_3$(C$_2$F$_5$)$_3$], [C$_{14}$H$_{29}$mim]Br (mim=methyl imidazolium), [Me$_2$N(C$_{12}$H$_{25}$)$_2$]NO$_3$, [emim]BF$_4$, [mm(3-NO$_2$)im][dinitrotriazolate] (wherein mm(3-NO$_2$)im=1,3-dimethyl(3-NO$_2$)imidazolium), [MeN(CH$_2$CH$_2$OH)$_3$], [MeOSO$_3$], [Hex$_3$PC$_{14}$H$_{29}$]NTf$_2$, [emim][EtOSO$_3$], [choline][ibuprofenate], [emim]NTf$_2$, [emim][(EtO)$_2$PO$_2$], [emim]Cl/CrCl$_2$, or [Hex$_3$PC$_{14}$H$_{29}$]N(CN)$_2$, but embodiments are not limited thereto, and any suitable material available as an ionic liquid, including those in the art, may be used. For example, the ionic liquid may be Pyr13FSI (N-propyl, N-methyl pyrrolidinium bis(fluorosulfonyl)imide), Pyr14FSI (N-butyl, N-methyl pyrrolidinium bis(fluorosulfonyl)imide), Pyr13TFSI (N-propyl, N-methyl pyrrolidinium bis(trifluoromethanesulfonyl)imide), Pyr14TFSI (N-butyl, N-methyl pyrrolidinium bis(trifluoromethanesulfonyl)imide), Pyr13TBETI (N-propyl, N-methyl pyrrolidinium bis(pentafluoroethanesulfonyl)imide), Pyr14BETI (N-butyl, N-methyl pyrrolidinium bis(pentafluoroethanesulfonyl)imide), Pyr13IM14 (N-propyl, N-methyl pyrrolidinium bis(nonafluorobutyl-sulfonyl)imide), or Pyr14IM14 (N-buthyl, N-methyl pyrrolidinium bis(nonafluorobutyl-sulfonyl)imide).

An amount of the organic liquid in the stretchable polymer electrolyte may be in a range of about 1 part to about 100 parts by weight, about 2 parts to about 90 parts by weight, about 3 parts to about 80 parts by weight, about 4 parts to about 70 parts by weight, about 5 parts to about 60 parts by weight, about 10 parts to about 50 parts by weight, or about 20 parts to about 40 parts by weight, based on 100 parts by weight of the stretchable copolymer. When the amount of the organic liquid in the stretchable polymer electrolyte is within these ranges, an ion conductivity of the stretchable polymer electrolyte may improve. Physical properties such as an elongation, an ion conductivity, and electrochemical stability of the stretchable polymer electrolyte may be controlled by controlling an amount of the organic liquid in the stretchable polymer electrolyte.

The stretchable polymer electrolyte may further include one or more inorganic particles. When the stretchable polymer electrolyte further includes one or more inorganic particles, a mechanical strength and an ion conductivity of the stretchable polymer electrolyte may improve. The inorganic particles may be a filler. As the inorganic particles act as a filler and forms a framework of the stretchable polymer electrolyte, a mechanical strength of the stretchable polymer electrolyte may improve. The inorganic particles may include at least one selected from a metal oxide, a metal sulfide, a metal nitride, a metal nitrate, a metal carbide, a metal carbonate, a carbonaceous material, and an organic-inorganic composite, but embodiments are not limited thereto, and any suitable material available as a filler of an electrolyte, including those in the art, may be used. For example, the inorganic particles may include at least one selected from SiO$_2$, TiO$_2$, Al$_2$O$_3$, AlN, SiC, BaTiO$_3$, graphite oxide, graphene oxide, a metal organic framework (MOF), polyhedral oligomeric silsesquioxanes (POSS), Li$_2$CO$_3$, Li$_3$PO$_4$, Li$_3$N, Li$_3$PS$_4$, Li$_2$O, and montmorillonite, but embodiments are not limited thereto, and any suitable material available as inorganic particles, including those in the art, may be used. The inorganic particles may be particles that do not have lithium ion conductivity. The inorganic particles may be nanoparticles.

An average particle diameter of the inorganic particles may be about 1,000 nanometers (nm) or less, about 500 nm or less, about 200 nm or less, about 100 nm or less, about 90 nm or less, about 80 nm or less, about 70 nm or less, about 60 nm or less, about 50 nm or less, about 40 nm or less, about 30 nm or less, or about 20 nm or less. The particle diameter of the inorganic particles may be an average particle diameter (D50) obtained from a particle size distribution curve measured by using a light scattering method. The average particle diameter with respect to a spherical particle refers to an average diameter, or may refer to an average length of a major axis with respect to a non-spherical particle. The particle size (i.e., average particle diameter) may be, for example, measured by using a particle size analyzer (PSA).

An amount of the one or more inorganic particles may be about 15 weight percent (wt %) or less, about 10 wt % or less, about 9 wt % or less, about 8 wt % or less, about 7 wt % or less, about 6 wt % or less, about 5 wt % or less, or about 4 wt % or less, based on the total weight of the stretchable copolymer and the one or more inorganic particles. When the amount of the one or more inorganic particles in the stretchable polymer electrolyte is within these ranges, an ion conductivity of the stretchable polymer electrolyte may improve. Physical properties such as an elongation, an ion conductivity, and electrochemical stability of the stretchable polymer electrolyte may be controlled by controlling an amount of the inorganic particles in the stretchable polymer electrolyte.

An elongation at break of the stretchable polymer electrolyte at room temperature may be about 50% or greater, about 60% or greater, about 70% or greater, about 80% or greater, about 90% or greater, about 100% or greater, about 110% or greater, about 120% or greater, about 130% or greater, about 150% or greater, about 180% or greater, about 200% or greater, or about 220% or greater. The elongation at break is a length increased by a stress until the stretchable polymer electrolyte breaks and is indicated as a percentage of an initial length. When the stretchable polymer electrolyte includes the stretchable polymer, the stretchable polymer electrolyte may be elongated and may have an excellent elongation at break, unlike a conventional rigid polymer electrolyte. For example, room temperature may be 25° C.

The elongation at break are calculated as defined in Equation 1:

Elongation at Break (%)=[(L$_f$-L$_0$)/L$_0$]×100%    Equation 1

In Equation 1, L$_f$ indicates a length of the stretchable polymer electrolyte at break, and L$_0$ indicates an initial length of the stretchable polymer electrolyte. The elongation at break of the stretchable polymer electrolyte may be measured by using Universal Test Machine (Intron 5565) at a strain rate of 100%/min.

A recovery of the stretchable polymer electrolyte at room temperature may be about 30% or greater, about 35% or greater, about 40% or greater, about 45% or greater, about 50% or greater, about 55% or greater, about 60% or greater, about 65% or greater, about 70% or greater, about 75% or greater, about 80% or greater, about 85% or greater, about 90% or greater, or about 95% or greater. The recovery is a length contracted (recovered) after a stress is removed and is indicated as a percentage of a length elongated by the stress. When the stretchable polymer electrolyte includes the stretchable polymer, the stretchable polymer electrolyte may be elongated and may have an excellent recovery, unlike a conventional rigid polymer electrolyte. For example, room temperature may be 25° C.

An ion conductivity of the stretchable polymer electrolyte at room temperature may be about $1\times10^{-5}$ Siemens per centimeter (S/cm) or greater, about $2\times10^{-5}$ S/cm or greater, about $3\times10^{-5}$ S/cm or greater, about $4\times10^{-5}$ S/cm or greater, about $5\times10^{-5}$ S/cm or greater, about $6\times10^{-5}$ S/cm or greater, about $7\times10^{-5}$ S/cm or greater, about $8\times10^{-5}$ S/cm or greater, about $9\times10^{-5}$ S/cm or greater, about $1\times10^{-4}$ S/cm or greater, or about $2\times10^{-4}$ S/cm or greater. The stretchable polymer electrolyte may have both an excellent elongation at break and an excellent ion conductivity at room temperature. For example, room temperature may be about 25° C. to about 30° C. The ion conductivity may be measured by using a current having an amplitude of 50 mV within a frequency band of 1 MHz to 100 MHz by using a VSP potentionstat (available from BioLogic Science Instruments, USA).

According to another embodiment, a stretchable electrode includes a stretchable copolymer; and an electrode active material, wherein the stretchable copolymer includes a non-crosslinked first repeating unit, a non-crosslinked second repeating unit and a crosslinked third repeating unit; the first repeating unit includes a first hard segment and a first soft segment; the second repeating unit includes a second hard segment and a second soft segment; and the third repeating unit includes a third hard segment and a third soft segment. When the stretchable electrode includes the stretchable polymer, the stretchable electrode may have both an excellent elongation at break and an excellent recovery.

The stretchable electrode may include a copolymer that is identical to the stretchable copolymer included in the stretchable polymer electrolyte. Details about the stretchable copolymer may be referred to in the description provided in relation to the stretchable polymer electrolyte.

An amount of the stretchable copolymer in the stretchable electrode may be in a range of about 0.1 parts to about 500 parts by weight, about 1 part to about 500 parts by weight, about 10 parts to about 450 parts by weight, about 20 parts to about 400 parts by weight, about 30 parts to about 350 parts by weight, about 40 parts to about 300 parts by weight, about 50 parts to about 250 parts by weight, or about 100 parts to about 200 parts by weight, based on 100 parts by weight of the electrode active material. When the amount of the stretchable copolymer is within these ranges, the stretchable electrode may have both an improved elongation at break and an excellent recovery. When an amount of the stretchable copolymer is too high, an energy density per unit weight of the electrode may deteriorate, and when an amount of the stretchable copolymer is too low, an elongation at break and a recovery may deteriorate.

The stretchable electrode may be a free standing film. In this regard, the since stretchable electrode maintains the form of a film without a support, the stretchable electrode may be easily prepared, stored, and handled. Accordingly, a convenient process of preparing an electrochemical device using the stretchable electrode may be used. Also, the stretchable electrode itself may be used as an electrode without a current collector, such as a metal foil current collector. Therefore, an energy density per unit weight of the electrochemical device including the stretchable electrode may significantly increase. For example, an energy density per unit weight of the stretchable electrode without a current collector may improve (e.g., be greater than) by about 1% or more, about 5% or more, about 10% or more, about 20% or more, about 30% or more, or about 50% or more, compared to an energy density per unit weight of a rigid electrode including a metal current collector.

An elongation at break of the stretchable electrode at room temperature may be about 5% or greater, about 10% or greater, about 15% or greater, about 20% or greater, about 25% or greater, about 30% or greater, about 35% or greater, about 40% or greater, about 45% or greater, about 50% or greater, about 55% or greater, about 60% or greater, or about 65% or greater. When the stretchable electrode includes the stretchable copolymer, the stretchable electrode may be elongated and may have an excellent elongation at break, unlike a conventional rigid electrode. For example, room temperature may be 25° C. Elongation at break may be calculated according to Equation 1, above.

A recovery of the stretchable electrode at room temperature may be about 30% or greater, about 35% or greater, about 40% or greater, about 45% or greater, about 50% or greater, about 55% or greater, about 60% or greater, about 65% or greater, about 70% or greater, about 75% or greater, about 80% or greater, about 85% or greater, about 90% or greater, or about 95% or greater. The recovery is a length contracted (recovered) of the stretchable electrode after a stress is removed from the stretchable electrode and is indicated as a percentage of a length elongated by the stress. When the stretchable electrode includes the stretchable copolymer, the stretchable electrode may be elongated and may have an excellent recovery, unlike a conventional rigid electrode. For example, room temperature may be 25° C.

The stretchable electrode includes the stretchable copolymer; and a positive electrode active material or a negative electrode active material. For example, the stretchable electrode may be a positive electrode including the stretchable copolymer and a positive electrode active material. For example, the stretchable electrode may be a negative electrode including the stretchable copolymer and a negative electrode active material.

A stretchable positive electrode may be prepared as follows.

For example, the stretchable positive electrode may be prepared by mixing a positive electrode active material, a conducting agent, and a solvent to prepare a positive electrode active material composition; mixing the positive electrode active material composition and a second pre-copolymer composition to prepare a mixture; coating the mixture on a substrate; and heat-treating the resultant to allow a crosslinking reaction of the second pre-copolymer composition, and thus the stretchable positive electrode may be prepared in the form of a film including a stretchable copolymer. The second pre-copolymer is a mixture of a first pre-copolymer and a second monomer, wherein the first pre-copolymer is obtained by reacting a chain extender (or an extended linker) and a first monomer. Since the stretchable positive electrode is a free standing film, the stretchable positive electrode may be used alone without a rigid current collector.

The positive electrode active material may include a lithium transition metal oxide. The lithium transition metal oxide may include at least one selected from a lithium cobalt oxide, a lithium nickel cobalt manganese oxide, a lithium nickel cobalt aluminum oxide, a lithium iron phosphate, and a lithium manganese oxide, but embodiments are not limited thereto, and any suitable material available as a positive electrode active material, including those in the art, may be used.

In some embodiments, the positive electrode active material may be a compound represented by one of the following formulae:

$Li_aA_{1-b}B'_bD'_2$ (where $0.90 \leq a \leq 1.8$, and $0 \leq b \leq 0.5$); $Li_aE_{1-b}B'_bO_{2-c}D'_c$ (where $0.90 \leq a \leq 1.8$, $0 \leq b \leq 0.5$, and $0 \leq c \leq 0.05$); $LiE_{2-b}B'_bO_{4-c}D'_c$ (where $0 \leq b \leq 0.5$, and $0 \leq c \leq 0.05$); $Li_aNi_{1-b-c}Co_bB'_cD'_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (where $0.90 \leq a \leq 1.8$, $0 \leq b \leq 0.5$, $0 \leq c \leq 0.05$, and $0 < \alpha < 2$); $Li_aNi_{1-b-c}Co_bB'_cO_{2-\alpha}F'_2$ (where $0.90 \leq a \leq 1.8$, $0 \leq b \leq 0.5$, $0 \leq c \leq 0.05$, and $0 < \alpha < 2$); $Li_aNi_{1-b-c}Mn_bB'_cD'_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (where $0.90 \leq a \leq 1.8$, $0 \leq b \leq 0.5$, $0 \leq c \leq 0.05$, and $0 < \alpha < 2$); $Li_aNi_{1-b-c}Mn_bB'_cO_{2-\alpha}F'_2$ (where $0.90 \leq a \leq 1.8$, $0 \leq b \leq 0.5$, $0 \leq c \leq 0.05$, and $0 < \alpha < 2$); $Li_aN i_bE_cG_dO_2$ (where $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.8$, and $0.001 \leq b \leq 0.1$); $Li_aCoG_bO_2$ (where $0.90 \leq a \leq 1.8$, and $0.001 \leq b \leq 0.1$); $Li_aMnG_bO_2$ (where $0.90 \leq a \leq 1.8$, and $0.001 \leq b \leq 0.1$); $Li_aMn_2G_bO_4$ (where $0.90 \leq a \leq 1.8$, and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$. In the formulae above, A may be selected from nickel (Ni), cobalt (Co), manganese (Mn), and combinations thereof; B' may be selected from aluminum (Al), nickel (Ni), cobalt (Co), manganese (Mn), chromium (Cr), iron (Fe), magnesium (Mg), strontium (Sr), vanadium (V), a rare earth element, and combinations thereof; D' may be selected from oxygen (O), fluorine (F), sulfur (S), phosphorus (P), and combinations thereof; E may be selected from cobalt (Co), manganese (Mn), and combinations thereof; F' may be selected from fluorine (F), sulfur (S), phosphorus (P), and combinations thereof; G may be selected from aluminum (Al), chromium (Cr), manganese (Mn), iron (Fe), magnesium (Mg), lanthanum (La), cerium (Ce), strontium (Sr), vanadium (V), and combinations thereof; Q is selected from titanium (Ti), molybdenum (Mo), manganese (Mn), and combinations thereof; I' is selected from chromium (Cr), vanadium (V), iron (Fe), scandium (Sc), yttrium (Y), and combinations thereof; and J may be selected from vanadium (V), chromium (Cr), manganese (Mn), cobalt (Co), nickel (Ni), copper (Cu), and combinations thereof.

The compounds listed above as positive electrode active materials may have a surface coating layer (hereinafter, also referred to as "coating layer"). Alternatively, a mixture of a compound without a coating layer and a compound having a coating layer, the compounds being selected from the compounds listed above, may be used. In some embodiments, the coating layer may include at least one compound of a coating element selected from oxide, hydroxide, oxyhydroxide, oxycarbonate, and hydroxycarbonate of the coating element. In some embodiments, the compounds for the coating layer may be amorphous or crystalline. In some embodiments, the coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a mixture thereof. In some embodiments, the coating layer may be formed using any method that does not adversely affect the physical properties of the positive electrode active material when a compound of the coating element is used. For example, the coating layer may be formed using a spray coating method or a dipping method. The coating methods may be well understood by one of ordinary skill in the art, and thus a detailed description thereof will be omitted.

In some embodiments, the positive electrode active material may be $LiNiO_2$, $LiCoO_2$, $LiMn_xO_{2x}$ (wherein x=1 or 2), $LiNi_{1-x}Mn_xO_2$ (wherein $0<x<1$), $LiNi_{1-x-y}Co_xMn_yO_2$ (where $0 \leq x \leq 0.5$ and $0 \leq y \leq 0.5$), or $LiFePO_4$.

Examples of the conducting agent may include natural graphite, artificial graphite, carbon black, acetylene black, or Ketjen black; carbon fibers; carbon nanotubes; or a metal powder or metal fibers of copper, nickel, aluminum, silver, or a combination thereof. Also, a conducting material such as a polyphenylene derivative or a mixture including a conducting material may be used, but examples of the conducting agent are not limited thereto, and any suitable material available as a conducting agent, including those in the art, may be used.

The positive electrode active material composition may further include a conventional binder in addition to the stretchable copolymer. Examples of the additional binder may include a vinylidene fluoride/hexafluoropropylene copolymer, polyvinylidene fluoride (PVDF), polyacrylonitrile, polymethyl methacrylate, polytetrafluoroethylene, and mixtures thereof, or a styrene-butadiene rubber polymer may be further used, but embodiments are not limited thereto, and any suitable material available as a binder, including those in the art, may be additionally used.

Examples of the solvent may include N-methylpyrrolidone (NMP), acetone, and water, but embodiments are not limited thereto, and any suitable material available as a solvent, including those in the art, may be used.

The amounts of the positive electrode active material, the conducting agent, the binder, and the solvent may be the same levels generally used in the art for lithium batteries. At least one of the conducting agent and the solvent may be omitted according to the use and the structure of the lithium battery.

A stretchable negative electrode may be prepared as follows.

The stretchable negative electrode may be prepared in the same manner as the positive electrode, except that a negative electrode active material is used instead of the positive electrode active material. Also, the same conducting agent, stretchable copolymer, and solvent used in the preparation of the positive electrode may be used in the preparation of a negative electrode active material composition.

For example, the stretchable negative electrode may be prepared in the form of a film including a stretchable copolymer by mixing a negative electrode active material, a conducting agent, and a solvent to prepare a negative electrode active material composition; mixing the negative electrode active material composition and a second pre-copolymer to prepare a mixture; coating the mixture on a substrate; and heat-treating the resultant to allow a cross-linking reaction of the resultant. The second pre-copolymer is a mixture of a first pre-copolymer and a second monomer, wherein the first pre-copolymer is obtained by reacting a chain extender (or an extended linker) and a first monomer. Since the stretchable negative electrode is a free standing film, the stretchable negative electrode may be used alone without a rigid current collector, or, for example, without a metal current collector.

The negative electrode active material may include a metal-based negative electrode active material, a transition metal oxide, a non-transition metal oxide, and a carbonaceous material.

For example, the metal/metalloid-based negative electrode active material may be at least one selected from a lithium metal; a metal/metalloid alloyable with lithium; a composite of a metal/metalloid alloyable with lithium and carbon; a composite of a metal/metalloid alloyable with lithium and nitrogen; a composite of a metal/metalloid alloyable with lithium, nitrogen, and carbon; a composite of a metal/metalloid alloyable with lithium and a metal inert to lithium; a composite of a metal/metalloid alloyable with lithium and a metal oxide inert to lithium; a composite of a metal/metalloid alloyable with lithium and a metal nitride inert to lithium; and a composite of metal/metalloid alloyable with lithium and a metal nitrate inert to lithium. For example, the metal/metalloid-based negative electrode active material may include at least one selected from a silicon-based active material, a tin-based active material, a silicon-tin alloy-based active material, and a silicon-carbon-based active material.

Examples of the metal/metalloid alloyable with lithium are Si, Sn, Al, Ge, Pb, Bi, Sb, a Si—X alloy (wherein X is an alkali metal, an alkali earth metal, a Group XIII element, a Group XIV element, a transition metal, a rare earth element, or a combination thereof, and X is not Si), and a Sn—X' alloy (wherein X' is an alkali metal, an alkali earth metal, a Group XIII element, a Group XIV element, a transition metal, a rare earth element, or a combination thereof, and X' is not Sn). In some embodiments, X or X' may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), thallium (Tl), germanium (Ge), phosphorus (P), arsenic (As), antimony (Sb), bismuth (Bi), sulfur (S), selenium (Se), tellurium (Te), polonium (Po), or a combination thereof.

For example, the composite of a metal alloyable with lithium and carbon may be an alloy or a composite represented by a formula, $Si_xSn_qM_yC_z$ (wherein q, x, y, and z are each an atom percent value; (a) $(q+x)>2y+z$; (b) x, y and z is each independently greater than 0; (c) q is 0 or greater; and (d) M is at least one metal selected from manganese, molybdenum, niobium, tungsten, tantalum, iron, copper, titanium, vanadium, chromium, nickel, cobalt, zirconium, yttrium, or a combination thereof).

For example, the composite of a metal alloyable with lithium and a metal inert (non-reactive) to lithium may be an alloy or a composite represented by a formula, $Si_xM_yAl_z$ (wherein x, y, and z are each an atom percent value; (a) $x+y+z=100$, (b) $x≥55$, (c) $y<22$, (d) $z>0$, and (d) M is at least one metal selected from manganese, molybdenum, niobium, tungsten, tantalum, iron, copper, titanium, vanadium, chromium, nickel, cobalt, zirconium, yttrium, or a combination thereof).

Examples of the transition metal oxide may include a lithium titanium oxide, a vanadium oxide, and a lithium vanadium oxide.

Examples of the non-transition metal oxide may include $SnO_2$ and $SiO_x$ (wherein $0<x<2$).

Examples of the carbonaceous material are crystalline carbon, amorphous carbon, and mixtures thereof. An example of the crystalline carbon is graphite, such as natural graphite or artificial graphite, in shapeless, plate, flake, spherical, or fibrous form. Examples of the amorphous carbon are soft carbon (carbon sintered at low temperatures), hard carbon, meso-phase pitch carbides, and sintered cokes.

Examples of the conducting agent may include natural graphite, artificial graphite, carbon black, acetylene black, or Ketjen black; carbon fibers; or a metal powder or metal fibers of copper, nickel, aluminum, silver, or a combination thereof. Also, a conducting material such as a polyphenylene derivative or a mixture including a conducting material may be used, but examples of the conducting material are not limited thereto, and any material available as a conducting material in the art may be used. Also, a crystalline material may be added as a conducting material.

Examples of the binder may include a vinylidene fluoride/hexafluoropropylene copolymer, polyvinylidene fluoride (PVDF), polyacrylonitrile, polymethyl methacrylate, polytetrafluoroethylene, and mixtures thereof, or a styrene-butadiene rubber polymer may be further used as a binder in addition to the cross-linked polymer, but embodiments are not limited thereto, and any material available as a binder in the art may be additionally used.

Examples of the solvent may include N-methylpyrrolidone, acetone, and water, but embodiments are not limited thereto, and any material available as a solvent in the art may be used.

The amounts of the negative electrode active material, the conducting agent, the binder, and the solvent may be in ranges commonly used in lithium batteries. At least one of the conducting agent and the solvent may be omitted according to a use and a structure of the lithium battery.

According to another embodiment, a stretchable copolymer is represented by Formula 4:

Formula 4

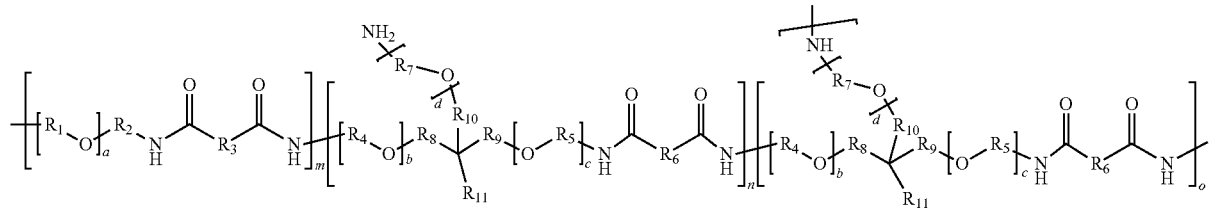

In Formula 4, each $R_1$, $R_2$, $R_3$, $R_4$, $R_5$, $R_6$, $R_7$, $R_8$, $R_9$, and $R_{10}$ are the same or different, and are each independently a divalent linking group, wherein the divalent linking group includes a linear or branched C2-C10 alkylene group substituted or not substituted with a halogen, a C6-C10 arylene group substituted or not substituted with a halogen, a C2-C10 heteroarylene group substituted or not substituted with a halogen, or a combination thereof; each $R_{11}$ is the same or different, and is a monovalent group, wherein the monovalent group includes a linear or branched C1-C10 alkyl group substituted or not substituted with a halogen, a C2-C10 alkenyl group substituted or not substituted with a halogen, a C2-C10 alkynyl group substituted or not substituted with a halogen, a C6-C10 cycloalkyl group substituted or not substituted with a halogen, a C6-C10 aryl group substituted or not substituted with a halogen, a C2-C10 heteroaryl group substituted or not substituted with a halogen, or a combination thereof; a, b, c, and d are each independently an integer of 2 to 20; and m, n, and o are molar fractions that satisfy $0<m<1$, $0<n<1$, $0<o<1$, and $m+n+o=1$, and a molar ratio n:o is in a range of about 9:1 to about 5:5. A molecular weight between crosslinks (Mc) of the stretchable copolymer may be in a range of about 6,000 Dalton to about 200,000 Dalton. The molecular weight between crosslinks (Mc) of the stretchable copolymer means the molecular weight between adjacent crosslinks (Mc) of the stretchable copolymer.

In the stretchable copolymer, when a non-crosslinked second repeating unit derived from a chain extender or an extended linker is disposed between a non-crosslinked first repeating unit and a crosslinked third repeating unit, a crosslinking density of the stretchable copolymer decreases, and thus the stretchable polymer may have both an excellent elongation at break and an excellent recovery.

For example, the stretchable copolymer may be represented by one of Formulae 5 and 6:

Formula 5

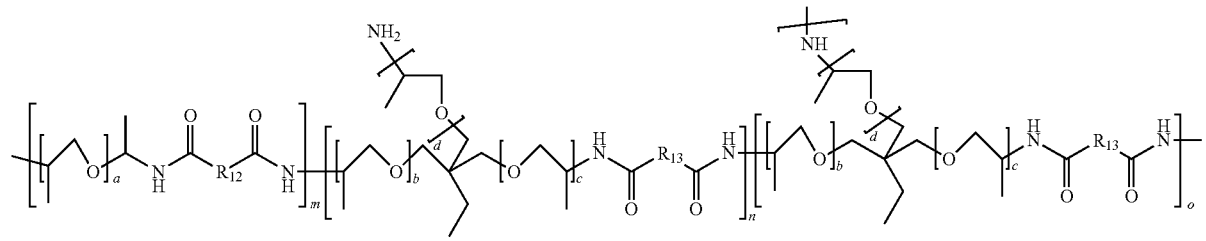

Formula 6

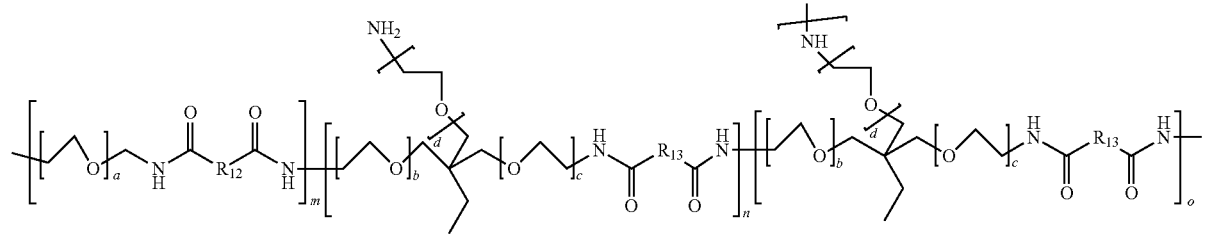

In Formulae 5 and 6, each Rig and Ria are the same or different, and are each independently a divalent linking group, wherein the divalent linking group includes a linear or branched C2-C10 alkylene group substituted or not substituted with a halogen, a C6-C10 arylene group substituted or not substituted with a halogen, or a combination thereof; a, b, c, and d are each independently an integer of 2 to 20; and m, n, and o are molar fractions that satisfy $0<m<1$, $0<n<1$, $0<o<1$, and $m+n+o=1$, and a molar ratio n:o is in a range of about 9:1 to about 5:5. A molecular weight between crosslinks (Mc) of the stretchable copolymer may be in a range of about 6,000 Dalton to about 200,000 Dalton.

For example, the stretchable polymer may be represented by one of Formulae 7 and 8:

Formula 7

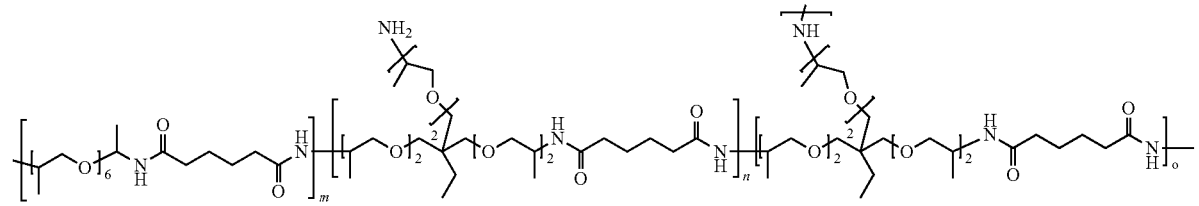

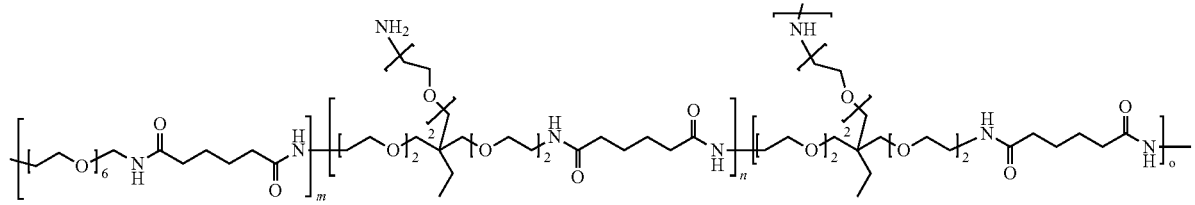

Formula 8

In Formulae 7 and 8, m, n, and o are molar ratios that satisfy $0<m<1$, $0<n<1$, $0<o<1$, and $m+n+o=1$, where n:o is in a range of about 9:1 to about 5:5. A molecular weight between crosslinks (Mc) of the stretchable polymer may be in a range of about 6,000 to about 200,000 Dalton.

The stretchable polymer may have an elongation at break of about 300% or greater and an elastic modulus of about 1.0 MPa or less, at room temperature (25° C.).

An elongation at break of the stretchable polymer at room temperature may be about 300% or greater, about 350% or greater, about 400% or greater, about 450% or greater, or about 500% or greater. The elongation at break is a length increased by a stress until the stretchable polymer electrolyte breaks and is indicated by a percentage of an initial length. When the stretchable polymer further includes the non-crosslinked repeating unit, the elongation at break of the stretchable polymer may improve compared to that of a polymer only including a crosslinked repeating unit. For example, room temperature may be 25° C.

A recovery of the stretchable polymer at room temperature may be about 30% or greater, about 35% or greater, about 40% or greater, about 45% or greater, about 50% or greater, about 55% or greater, about 60% or greater, about 65% or greater, about 70% or greater, about 75% or greater, about 80% or greater, about 85% or greater, about 90% or greater, or about 95% or greater. The recovery is a length contracted (recovered) after a stress is removed and is indicated as a percentage of a length elongated by the stress. When the stretchable copolymer includes a non-crosslinking repeating unit, a recovery of the stretchable copolymer may improve compared to that of a copolymer only including a crosslinked repeating unit. For example, room temperature may be 25° C.

An elastic modulus (or Young's modulus) of the stretchable copolymer at room temperature may be about 1.0 megapascals (MPa) or less, about 0.8 MPa or less, about 0.6 MPa or less, about 0.4 MPa or less, about 0.2 MPa or less, about 0.1 MPa or less, about 0.08 MPa or less, about 0.06 MPa or less, about 0.04 MPa or less, or about 0.02 MPa or less. An elastic modulus of the stretchable copolymer at room temperature may be about 0.001 MPa or greater, about 0.005 MPa or greater, or about 0.01 MPa or greater. For example, the elastic modulus may be about 0.001 MPa to about 1.0 MPa, or about 0.005 MPa to about 0.8 MPa, or about 0.01 MPa to about 0.4 MPa. When the elastic modulus is within these ranges, the stretchable copolymer may have improved flexibility. For example, room temperature may be 25° C.

The stretchable copolymer may be used as a binder. For example, the stretchable copolymer may be used as a binder in a lithium battery.

According to another embodiment, an electrochemical device includes at least one selected from the stretchable polymer electrolyte, the stretchable electrode, and the stretchable copolymer.

When the electrochemical device includes at least one selected from the stretchable polymer electrolyte, the stretchable electrode, and the stretchable copolymer, the electrochemical device may have excellent electrochemical characteristics. For example, the electrochemical device may be stretched. Examples of the electrochemical device may include a lithium battery, a capacitor, and an electrochromic device, but embodiments are not limited thereto.

A lithium battery includes a positive electrode; a negative electrode; and an electrolyte between the positive electrode and the negative electrode as described above. For example, at least one of the positive electrode and the negative electrode each may be a stretchable electrode. For example, the electrolyte may be a stretchable polymer electrolyte.

For example, a lithium battery including a stretchable polymer electrolyte may be prepared as follows.

Figure 9:
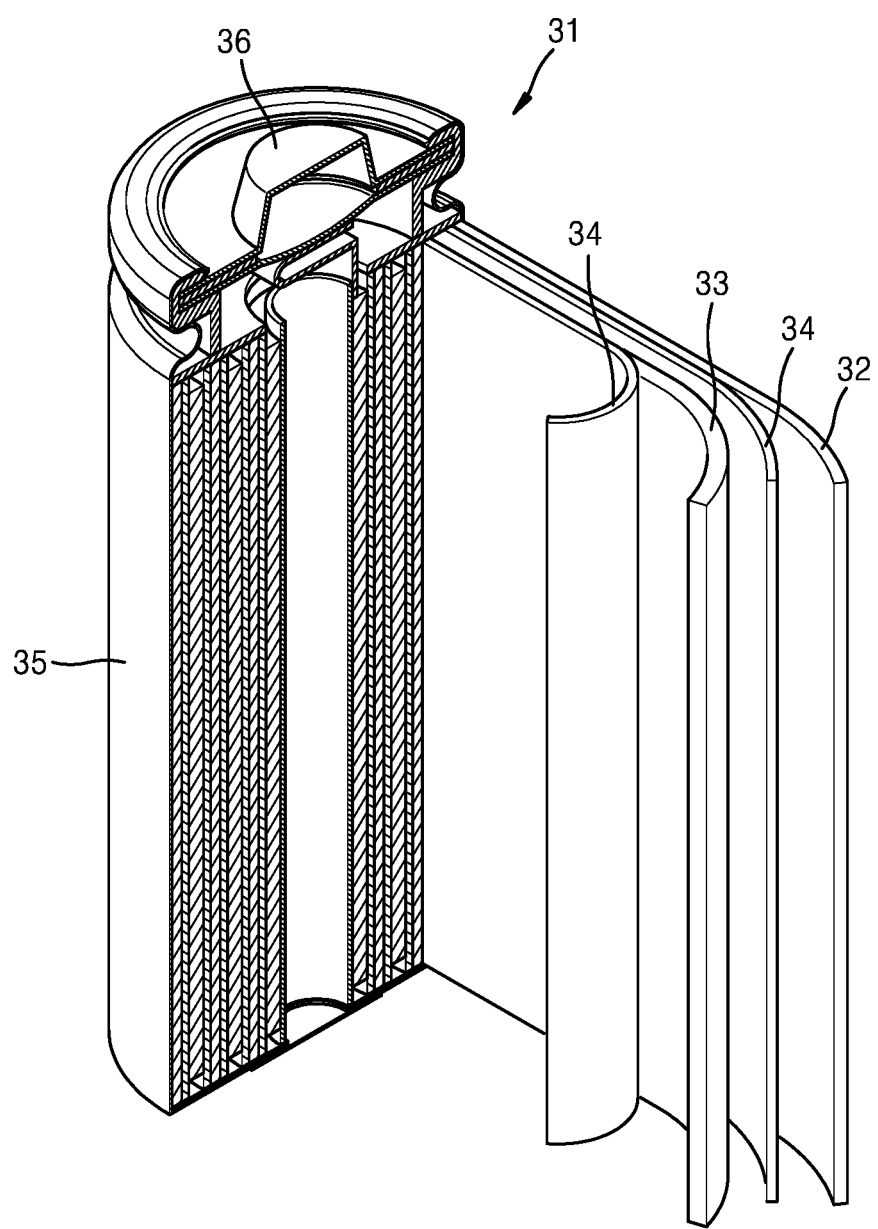
FIG. 9 is a schematic view of a lithium battery according to an embodiment.
Figure 10A:
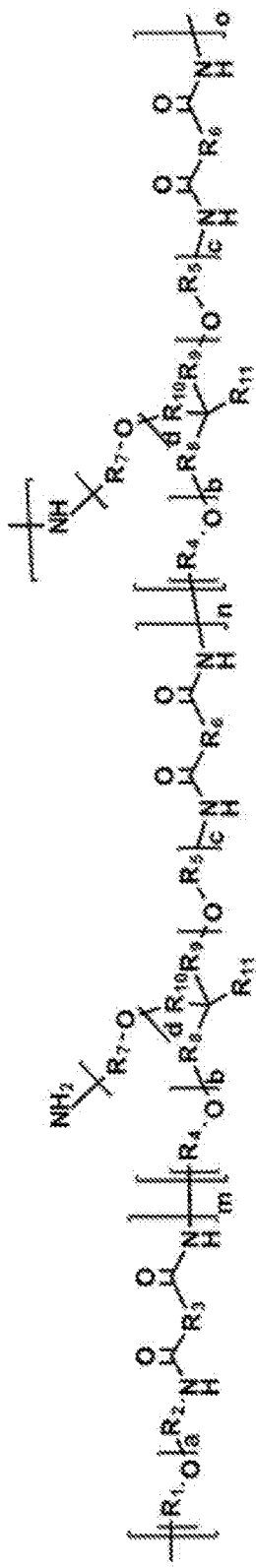
FIG. 10A shows the structures for Formula 4, Formula 5, and Formula 6 in accordance with one or more embodiments.
Figure 10A:
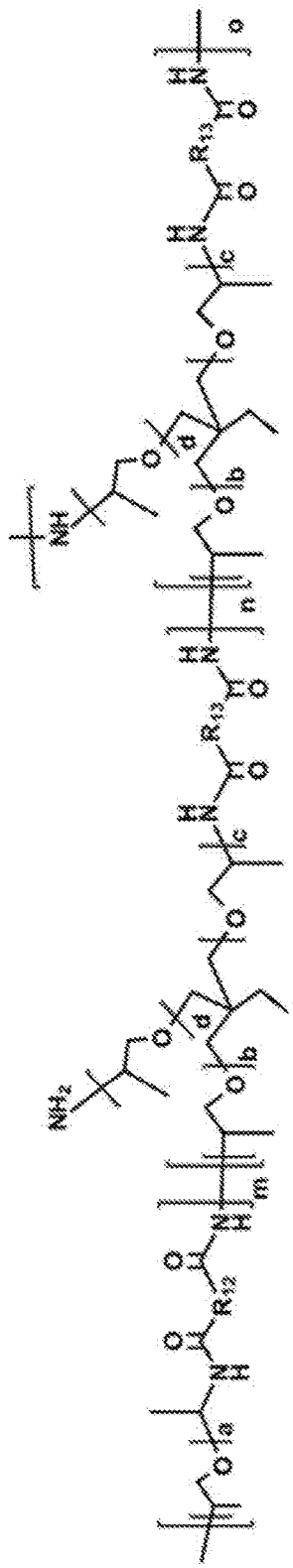
Figure 10A:
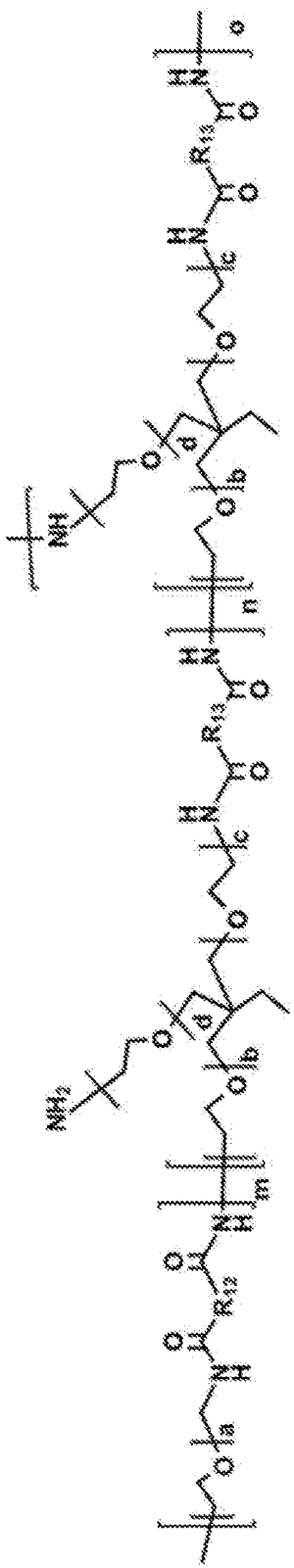
Figure 10B:
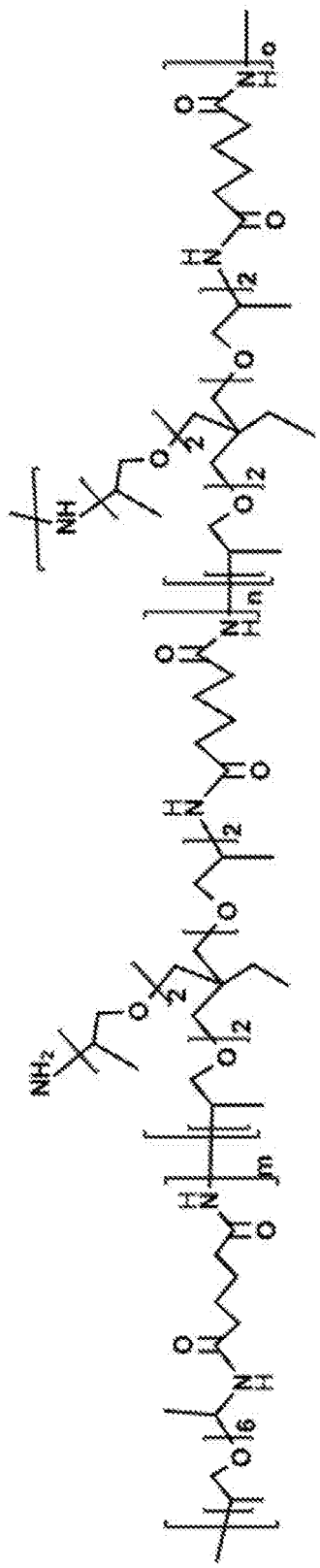
FIG. 10B shows the structures for Formula 7 and Formula 8 in accordance with one or more embodiments.
Figure 10B:
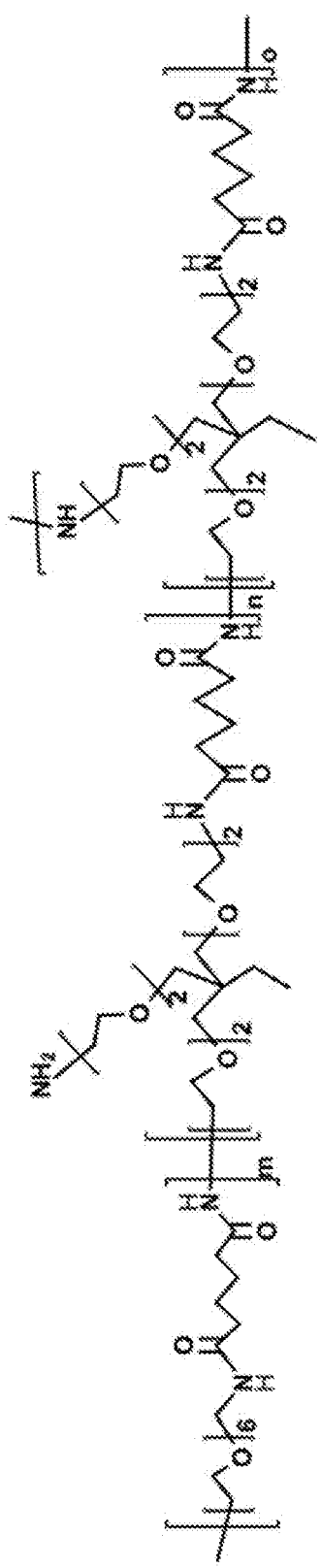
Figure 10C:
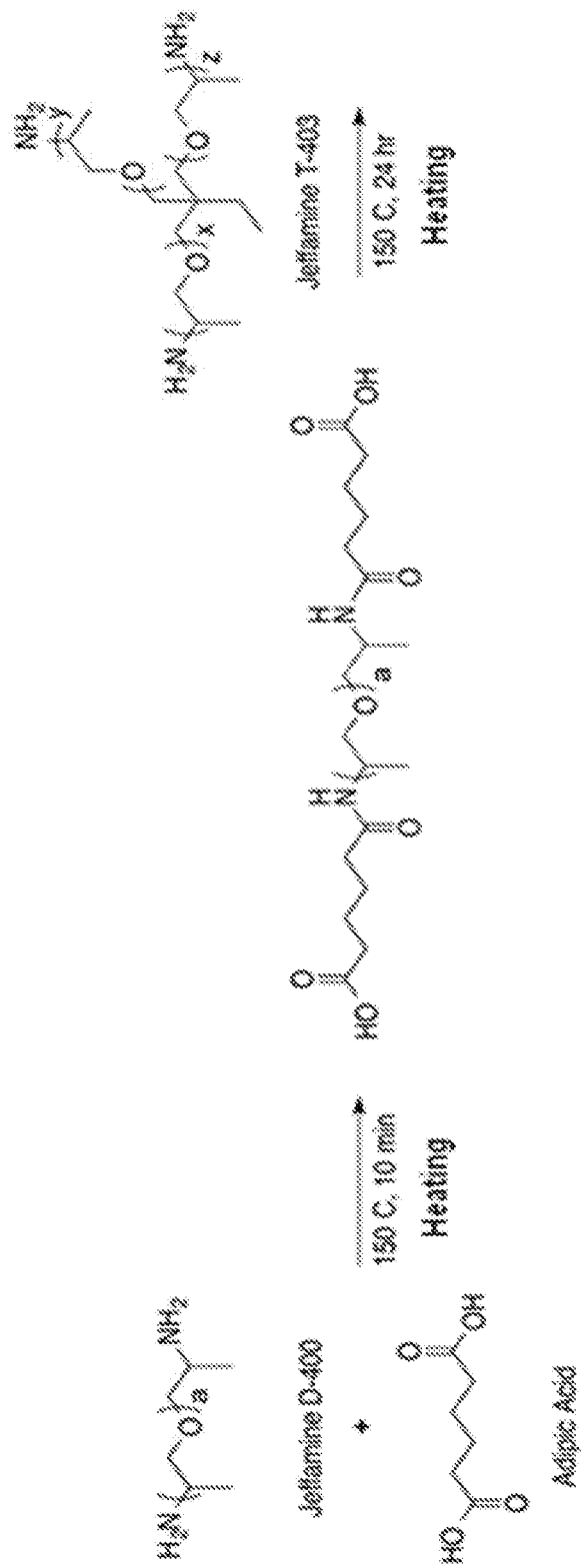
FIG. 10C shows Reaction Scheme 1 in accordance with one or more embodiments.
Figure 10D:
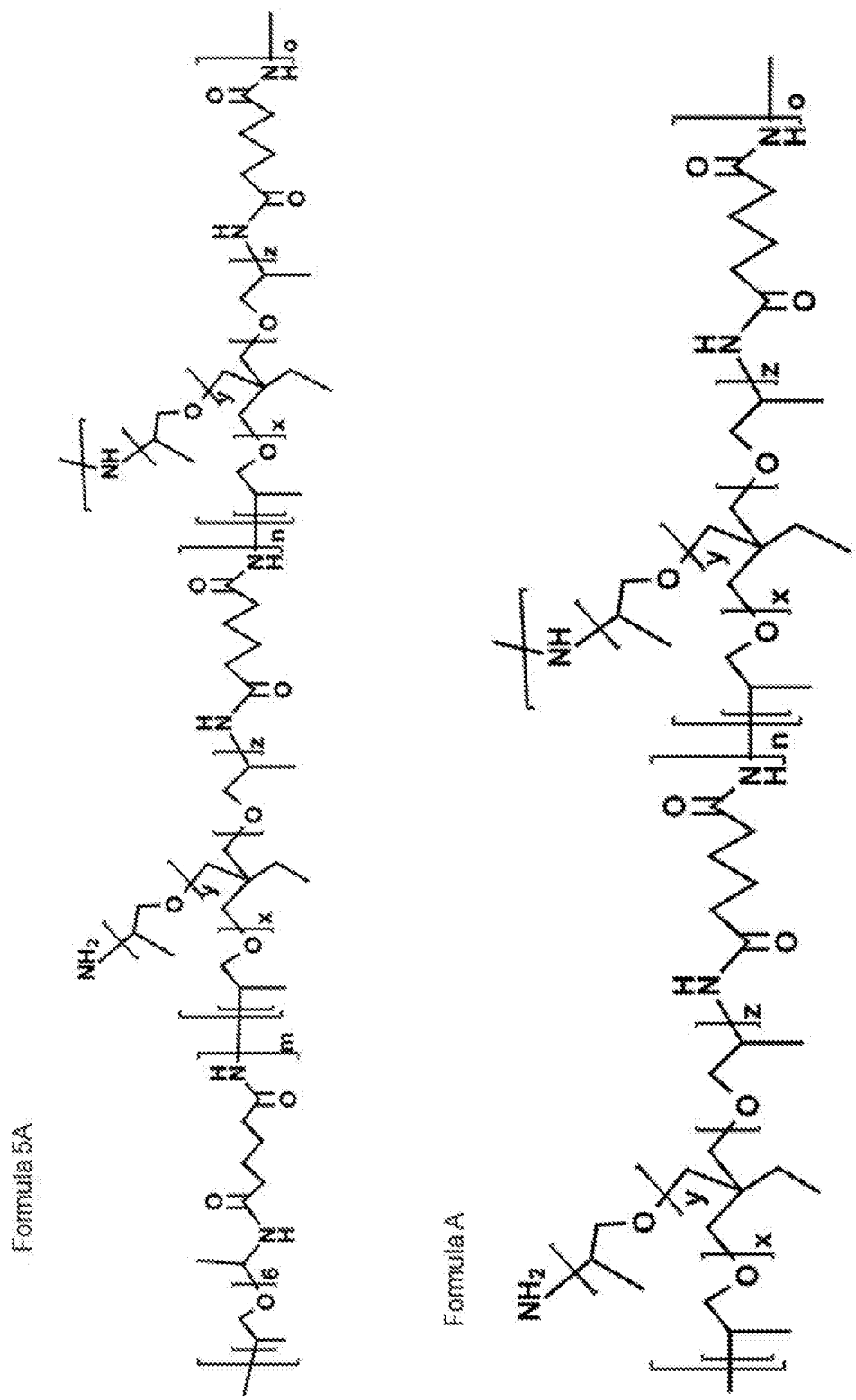
FIG. 10D shows the structures for Formula 5A and Formula A in accordance with one or more embodiments.

First, a positive electrode and a negative electrode are prepared in the same manner as used in the method of preparing a stretchable electrode, except that a stretchable copolymer is not added. Next, the stretchable polymer electrolyte is disposed between the positive electrode and the negative electrode. An organic electrolyte solution may be prepared by dissolving a lithium salt in an organic solvent. The organic solvent and the lithium salt may be those selected from examples of the organic solvent and the lithium salt used in the stretchable polymer electrolyte. As shown in FIG. 9, a lithium battery 31 includes a positive electrode 33, a negative electrode 32, and a solid polymer electrolyte 34. The positive electrode 33, the negative electrode 32, and the solid polymer electrolyte 34 may be wound or folded, and then sealed in a battery case 35. In some embodiments, the battery case 35 may be filled with the organic electrolytic solution and sealed with a cap assembly 36, thereby completing the manufacture of the lithium battery 31.

In some embodiments, a lithium battery including a stretchable electrode may be prepared as follows.

First, at least one of a stretchable positive electrode and a stretchable negative electrode is prepared in the same manner as used in the method of preparing a stretchable electrode. The stretchable positive electrode and/or the stretchable negative electrode may be used after being impregnated in an organic electrolyte solution before being assembled in a battery. A rigid electrode may be prepared in the same manner as used in a conventional method. Next, a separator to be disposed between the stretchable positive electrode and the stretchable negative electrode is prepared. The separator for the lithium battery may be any separator that is commonly used in lithium batteries. In some embodiments, the separator may have low resistance to migration of ions in an electrolyte and have an excellent electrolyte-retaining ability. Examples of the separator are glass fiber, polyester, Teflon, polyethylene, polypropylene, polytetrafluoroethylene (PTFE), and a combination thereof, each of which may be a non-woven or woven fabric. For example, a rollable separator including polyethylene or polypropylene may be used for a lithium ion battery. A separator with a good organic electrolytic solution-retaining ability may be used for a lithium ion polymer battery. For example, the separator may be manufactured in the following manner. In some embodiments, a polymer resin, a filler, and a solvent may be mixed together to prepare a separator composition. Then, the separator composition may be directly coated on an electrode, and then dried to form the separator. In some embodiments, the separator composition may be cast on a support and then dried to form a separator film, which may then be separated from the support and laminated on an electrode to form the separator. The polymer resin used to manufacture the separator may be any material that is commonly used as a binder for electrode plates. Examples of the polymer resin are a vinylidenefluoride/hexafluoropropylene copolymer, polyvinylidene fluoride (PVDF), polyacrylonitrile, polymethylmethacrylate, and a mixture thereof. Then, an electrolyte is prepared. In some embodiments, the electrolyte may be an organic electrolyte solution. In some embodiments, the organic electrolyte solution may be prepared by dissolving a lithium salt in an organic solvent. The organic solvent and the lithium salt may be those selected from examples of the organic solvent and the lithium salt used in the stretchable polymer electrolyte. Referring to FIG. 9, a lithium battery 31 includes a positive electrode 33, a negative electrode 32, and a separator 34. In some embodiments, the positive electrode 33, the negative electrode 32, and the separator 34 may be wound or folded, and then sealed in a battery case 35. In some embodiments, the battery case 35 may be filled with an organic electrolytic solution and sealed with a cap assembly 36, thereby completing the manufacture of the lithium battery 31. In some embodiments, the battery case 35 may be a cylindrical type, a rectangular type, or a thin-film type.

Although the battery case 35 is a cylindrical type in FIG. 9, the battery case 35 may be in a pouch type and thus may be bent or stretched.

Since the lithium battery 31 is stretchable, the lithium battery 31 may be used in a wearable electronic device.

According to another embodiment, a method of preparing a stretchable copolymer includes reacting a first monomer including at least two reactive terminal functional groups with a chain extender including an alkylene oxide repeating unit to prepare a first pre-copolymer composition; mixing the first pre-copolymer composition and a second monomer including a crosslinking terminal functional group to prepare a second pre-copolymer composition; and crosslinking the second pre-copolymer composition to provide the stretchable copolymer.

The first monomer including at least two reactive terminal functional groups may be a dicarboxylic acid. Examples of dicarboxylic acids may include oxalic acid, malonic acid, succinic acid, glutaric acid, adipic acid, pimelic acid, suberic acid, azelaic acid, sebasic acid, undecadioic acid, dodecadioic acid, 1,4-cyclohexanedicarboxylic acid, phthalic acid, isophthalic acid, terephthalic acid, hexahydrophthalic acid, hexahydroisophthalic acid, paraxylylene dicarboxylic acid, methaxylylene dicarboxylic acid, phthalic acid, 2,6-naphthalene dicarboxylic acid, ',4'-diphenyldicarboxylic acid, and combinations thereof.

The first monomer including at least two reactive terminal functional groups may be diisocyanate. Diisocyanate may be at least one selected from toluenediisocyanate (TDI), 4,4-methylenediphenyl diisocyanate (MDI), 1,5-naphthylene diisocyanate (NDI), 6-hexamethylene diisocyanate (HMDI), isophorone diisocyanate (IPDI), xylene diisocyanate (XDI), tetramethyl xylene diisocyanate (TMXDI), and 1,8-diisocyanate methyl octane.

The first monomer including at least two reactive terminal functional groups may be tetracarboxylic dianhydride. Examples of tetracarboxylic dianhydride may include 3,3',4,4'-biphenyl tetracarboxylic dianhydride (s-BPDA, pyromellitic dianhydride (PMDA), or a combination thereof. Also, the tetracarboxylic dianhydride may be 2,3,3',4'-biphenyltetracarboxylic acid dianhydride (a-BPDA), oxydiphthalic acid dianhydride, diphenylsulfone-3,4,3',4'-tetracarboxylic acid dianhydride, bis(3,4-dicarboxyphenyl)sulfide dianhydride, 2,2-bis(3,4-dicarboxyphenyl)-1,1,1,3,3,3-hexafluoropropane dianhydride, 2,3,3',4'-benzophenone tetracarboxylic acid dianhydride, 3,3',4,4'-benzophenonetetracarboxylic dianhydride, bis(3,4-dicarboxyphenyl)methane dianhydride, 2,2-bis(3,4-dicarboxyphenyl)propane dianhydride, p-phenylene-bis(trimellitic acid monoester acid anhydride), p-biphenylene-bis(trimellitic acid monoester acid anhydride), m-terphenyl-3,4,3',4'-tetracarboxylic acid dianhydride, p-terphenyl-3,4,3',4'-tetracarboxylic acid dianhydride, 1,3-bis(3,4-dicarboxyphenoxy) benzene dianhydride, 1,4-bis(3,4-dicarboxyphenoxy) benzene dianhydride, 1,4-bis(3,4-dicarboxyphenoxy) biphenyl dianhydride, 2,2-bis[(3,4-dicarboxyphenoxy) phenyl] propane dianhydride, 2,3,6,7-naphthalenetetracarboxylic dianhydride, 1,4,5,8-naphthalenetetracarboxylic dianhydride, 4,4'-(2,2-hexafluoroisopropylidene) diphthalic acid dianhydride, or a combination thereof. These tetracarboxylic dianhydrides may be used alone or as a combination of at least two selected therefrom.

The chain extender including an alkylene oxide repeating unit may be a diamine including a polyalkylene oxide chain. For example, the chain extender including an alkylene oxide repeating unit may be a terminal diamine including a polyethylene oxide chain or a terminal diamine including a polypropylene oxide chain.

The second monomer including a crosslinking terminal functional group may be a triamine including a plurality of polyalkylene oxide chains. For example, the second monomer including a crosslinking terminal functional group may be a terminal triamine including two or more polyethylene oxide chains or a terminal triamine including two or more polypropylene oxide chains. As used herein, "terminal triamine" means a monomer having three terminal primary amines.

The first pre-copolymer composition may be prepared by mixing the first monomer including at least two reactive terminal functional groups and the chain extender including an alkylene oxide repeating unit; and heat-treating the pre-copolymer composition at a temperature in a range of about 100° C. to about 200° C. for 1 minute to 30 minutes. Through the heat-treating of the mixture, a pre-copolymer having a structure in which the chain extender is linked between the first monomers may be prepared.

The second pre-copolymer composition may be prepared by mixing the first pre-copolymer and the second monomer including a crosslinking terminal functional group. The second pre-copolymer composition may be heat-treated at a temperature in a range of about 100° C. to about 200° C. for 10 minutes to 30 minutes to perform a crosslinking reaction thereon, and thus a stretchable copolymer may be prepared.

The second pre-copolymer composition may further include one or more inorganic particles. When the second pre-copolymer composition further includes inorganic particles, mechanical properties of the stretchable copolymer obtained by the crosslinking reaction may improve. For example, an elastic modulus of the stretchable copolymer may increase. A type and an amount of the inorganic particles may be referred to the description provided in relation to the stretchable polymer electrolyte.

As used herein, a substituent may be derived by substitution of at least one hydrogen atom in an unsubstituted mother group with another atom or a functional group. Unless stated otherwise, a "substituted" functional group refers to a functional group substituted with at least one substituent selected from a halogen, a C1-C40 alkyl group, a C2-C40 alkenyl group, a C3-C40 cycloalkyl group, a C3-C40 cycloalkenyl group, and a C6-C40 aryl group. When a functional group is "optionally substituted", it means that the functional group may be substituted with such a substituent as listed above.

As used herein, in the expressions regarding the number of carbons, i.e., a capital "C" followed by a number, for example, "C1-C20", "C3-C20", or the like, the number such as "1", "3", or "20" following "C" indicates the number of carbons in a particular functional group. That is, a functional group may include from 1 to 20 carbon atoms. For example, a "C1-C4 alkyl group" refers to an alkyl group having 1 to 4 carbon atoms, such as $CH_3$—, $CH_3CH_2$—, $CH_3CH_2CH_2$—, $(CH_3)_2CH$—, $CH_3CH_2CH_2CH_2$—, $CH_3CH_2CH(CH_3)$—, and $(CH_3)_3C$—.

As used herein, a particular group or substituent includes both a monovalent radical and a divalent radical depending on the context. For example, when a substituent needs two binding sites for binding with the rest of the molecule, the substituent may be understood as a divalent radical. For example, a substituent specified as an alkyl group that needs two binding sites may be a divalent radical, such as —$CH_2$—, —$CH_2CH_2$—, or —$CH_2CH(CH_3)CH_2$—. The term "alkylene" clearly indicates that the radical means a divalent radical.

As used herein, the terms "alkyl group" or "alkylene group" refers to a branched or unbranched aliphatic hydrocarbon group. For example, the alkyl group may be substituted or not be substituted. Non-limiting examples of the alkyl group are a methyl group, an ethyl group, a propyl group, an isopropyl group, a butyl group, an isobutyl group, a tert-butyl group, a pentyl group, a hexyl group, a cyclopropyl group, a cyclopentyl group, a cyclohexyl group, and a cycloheptyl group, each of which may be optionally substituted or not. In some embodiments, the alkyl group may have 1 to 6 carbon atoms. For example, a C1-C6 alkyl group may be a methyl group, an ethyl group, a propyl group, an isopropyl group, a butyl group, an iso-butyl group, a sec-butyl group, a pentyl group, a 3-pentyl group, or a hexyl group, but is not limited thereto.

As used herein, the term "alkenyl group" refers to a hydrocarbon group including 2 to 20 carbon atoms with at least one carbon-carbon double bond. Non-limiting examples of the alkenyl group are an ethenyl group, a 1-propenyl group, a 2-propenyl group, a 2-methyl-1-propenyl group, a 1-butenyl group, a 2-butenyl group, a cyclopropenyl group, a cyclopentenyl group, a cyclohexenyl group, and a cycloheptenyl group. For example, these alkenyl groups may be substituted or not be substituted. For example, an alkenyl group may have 2 to 20 carbon atoms.

As used herein, the term "alkynyl group" refers to a hydrocarbon group including 2 to 20 carbon atoms with at least one carbon-carbon triple bond. Non-limiting examples of the alkynyl group are an ethynyl group, a 1-propynyl group, a 1-butynyl group, and a 2-butynyl group. For example, these alkynyl groups may be substituted or not. For example, an alkynyl group may have 2 to 20 carbon atoms.

As used herein, the term "cycloalkyl group" or "cycloalkylene" refers to a cyclic alkyl group having one or more carbocyclic rings, or ring system, which is fully saturated. For example, the "cycloalkyl group" may refer to a cyclopropyl group, a cyclobutyl group, a cyclopentyl group, or a cyclohexyl group. The term "cycloalkylene" refers to a divalent cycloalkyl group.

As used herein, the term "aliphatic" refers to a chain or a chain system other than a ring or ring system with a conjugated π electron system, and may refer to an aliphatic carbocyclic group (for example, a cyclohexyl group).

As used herein, the term "aromatic" refers to a ring or ring system with a conjugated π electron system, and may refer to an aromatic carbocyclic group (for example, a phenyl group) and an aromatic heterocyclic group (for example, a pyridine group). For example, an aromatic ring system as a whole may include a monocyclic ring or a fused polycyclic ring (i.e., a ring that shares adjacent atom pairs) if the whole ring system is aromatic.

As used herein, the terms "aryl group" refers to an aromatic ring having a ring skeleton including only carbon atoms, or ring system (i.e., two or more fused rings, which share two or more adjacent carbon atoms), or to a plurality of aromatic rings that are linked to each other by a single bond, —O—, —S—, —C(=O)—, —S(=O)$_2$—, —Si(Ra)(Rb)— (wherein Ra and Rb are each independently a C1-C10 alkyl group), a C1-C10 alkylene group substituted or unsubstituted with a halogen, or —C(=O)—NH—. When the aryl group is a ring system, each ring in the ring system is aromatic. Non-limiting examples of the aryl group are a phenyl group, a biphenyl group, a naphthyl group, a phenanthrenyl group, and a naphthacenyl group. These aryl groups may be substituted or not.

As used herein, the terms "arylene group" refers to an aryl group that requires at least two connection points. A tetravalent arylene group is an aryl group that requires at least four connection points, and a divalent arylene group is an aryl group that requires two connection points. Non-limiting examples of the aryl group is —$C_6H_5$—O—$C_6H_5$—.

As used herein, the term "heteroaryl group" refers to an aromatic ring system having a single ring, a plurality of fused rings, or to a plurality of rings linked to each other by a single bond, —O—, —S—, —C(=O)—, —S(=O)$_2$—, —Si(Ra)(Rb)— (where Ra and Rb are each independently a C1-C10 alkyl group), a C1-C10 alkylene group substituted or unsubstituted a halogen, or —C(=O)—NH—, in which at least one member of a ring is a heteroatom, i.e., is not carbon. In the fused ring system, at least one heteroatom may be in only one ring. For example, the heteroatom may be oxygen, sulfur, or nitrogen, but is not limited thereto. Non-limiting examples of the heteroaryl group are a furanyl group, a thienyl group, an imidazolyl group, a quinazolinyl group, a quinolinyl group, an isoquinolinyl group, a quinoxalinyl group, a pyridinyl group, a pyrrolyl group, an oxazolyl group, and an indolyl group.

As used herein, the terms "heteroarylene group" refers to a heteroaryl group that requires at least two connection points. A tetravalent heteroarylene group is a heteroaryl group that requires at least four connection points, and a divalent heteroarylene group is a heteroaryl group that requires two connection points.

As used herein, the term "halogen" refers to a stable atom belonging to Group 17 of the Periodic Table of Elements, for example, fluorine, chlorine, bromine, or iodine. For example, the halogen atom may be fluorine and/or chlorine.

A weight average molecular weight (Mw) of the stretchable copolymer is measured by using a gel permeation chromatography (GPC) based on a polystyrene standard sample.

Hereinafter, one or more exemplary embodiments will be described in detail with reference to the following Examples. However, these Examples are not intended to limit the scope of the one or more embodiments of the present disclosure.

EXAMPLES

Preparation of Crosslinking Polymer

Example 1: Synthesis of D400+Adipic Acid+T403 Stretchable Copolymer

A stretchable copolymer represented by Formula 6A was synthesized according to Reaction Scheme 1.

100 parts by weight of JEFFAMINE D400 (available from Huntsman), as a chain extender, and 68 parts by weight of an adipic acid (available from Sigma), as a first monomer, were mixed to prepare a mixture. The mixture was heated at 150° C. for 10 minutes to prepare a first prepolymer. 98 parts by weight of JEFFAMINE T403 (available from Huntsman, x+y+z=5~6), as a second monomer, per 100 parts by weight of JEFFAMINE D400 (available from Huntsman, a=6) was added to the first prepolymer, and the resultant was stirred at 150° C. for 10 minutes to prepare a second prepolymer composition having a homogenous composition. The second prepolymer was coated on a glass substrate, crosslinked, and then dried in a vacuum state of 150° C. for 24 hours, and then a resulting stretchable polymer film was separated from the glass substrate. A molecular weight between crosslinks (Mc) of the synthesized stretchable polymer represented by Formula 5A was 10,755 Dalton and a molar ratio of m:n:o was 5:4.5:0.5.

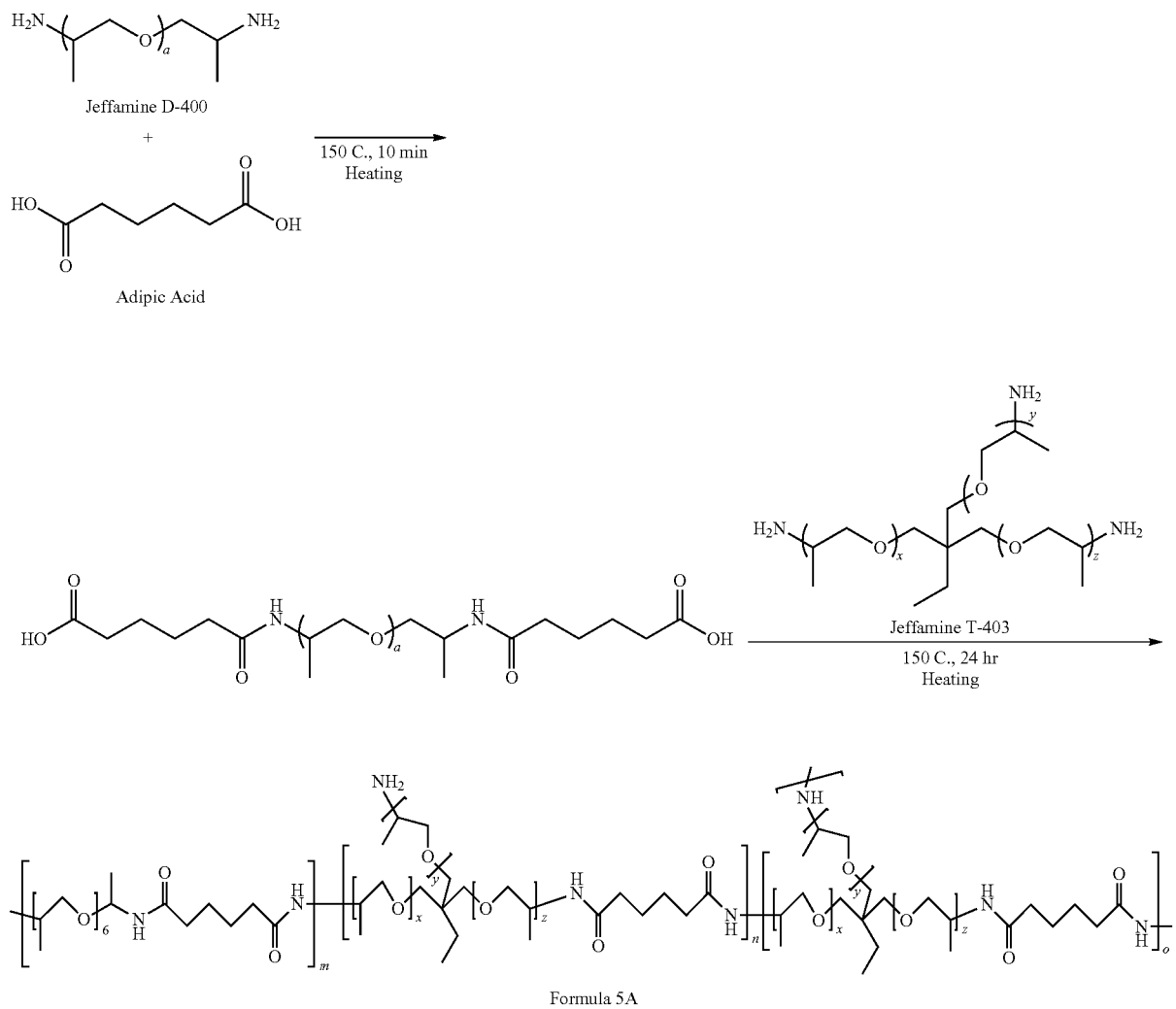

Reaction Scheme 1

Formula 5A

Example 2: Synthesis of D400+Adipic Acid+T403+SiO₂ (1 wt %) Stretchable Copolymer A stretchable copolymer was synthesized in the same manner as in Example 1, except that silica (SiO$_2$ having an average particle diameter of 14 nm) was added to the second prepolymer. An amount of silica in the stretchable copolymer was 1 wt %.

Example 3: Synthesis of D400+Adipic Acid+T403+SiO₂ (2 wt %) Stretchable Copolymer A stretchable copolymer was synthesized in the same manner as in Example 1, except that silica (SiO$_2$ having an average particle diameter of 14 nm) was added to the second prepolymer. An amount of silica in the stretchable copolymer was 2 wt %.

Example 4: Synthesis of D400+Adipic Acid+T403+SiO₂ (3 wt %) Stretchable Copolymer A stretchable copolymer was synthesized in the same manner as in Example 1, except that silica (SiO$_2$ having an average particle diameter of 14 nm) was added to the second prepolymer. An amount of silica in the stretchable copolymer was 3 wt %.

Comparative Example 1: Synthesis of Adipic Acid+T403 Stretchable Copolymer 68 parts by weight of an adipic acid (available from Sigma), as a first monomer, and 98 parts by weight of JEFFAMINE T403 (available from Huntsman, x+y+z=5~6), as a second monomer, were mixed and stirred at 150° C. for 10 minutes to prepare a third prepolymer having a homogenous composition. The third prepolymer was coated on a glass substrate and crosslinked and dried in a vacuum state of 150° C. for 24 hours, and then a stretchable polymer film was separated from the glass substrate. A molecular weight between crosslinks (Mc) of the synthesized stretchable copolymer represented by Formula A was 5354 Dalton and a molar ratio of n:o was 4.5:0.5.

vacuum oven for 12 hours to prepare a lithium salt-containing copolymer film including 27 wt % of lithium bis (trifluoromethane sulphonyl) imide (LiN(SO$_2$CF$_3$)$_2$) (LiTFSI).

The lithium salt-containing copolymer film was disposed between 2 sheets of slide glass in an argon-filled glove box and impregnated in propylene carbonate (PC) (available from Sigma) for 2 hours to prepare a stretchable polymer electrolyte including 30 wt % of propylene carbonate. While impregnating the lithium salt-containing copolymer film in propylene carbonate, the lithium salt-containing polymer film absorbed propylene carbonate, and thus a volume of the lithium salt-containing polymer film increased.

Example 6: Stretchable Polymer Electrolyte Including 0 wt % of Silica and 14 wt % of Lithium Salt A stretchable polymer electrolyte was prepared in the same manner as in Example 5, except that an amount of the LiTFSI lithium salt was changed to 14 wt %.

Example 7: Stretchable Polymer Electrolyte Including 1 wt % of Silica and 27 wt % of Lithium Salt A stretchable polymer electrolyte was prepared in the same manner as in Example 5, except that the stretchable copolymer film including 1 wt % of silica prepared in Example 2 was used.

Example 8: Stretchable Polymer Electrolyte Including 1 wt % of Silica and 14 wt % of Lithium Salt A stretchable polymer electrolyte was prepared in the same manner as in Example 7, except that an amount of the LiTFSI lithium salt was changed to 14 wt %.

Formula A

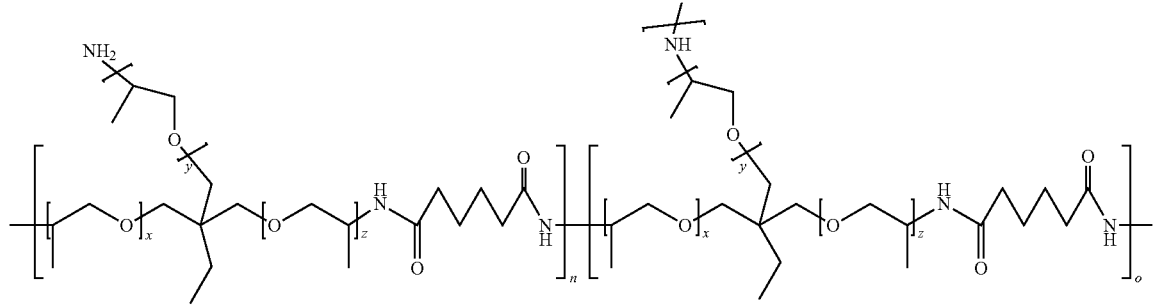

Example 5: Stretchable Copolymer Electrolyte Including 0 wt % of Silica and 27 wt % of Lithium Salt The stretchable copolymer film prepared in Example 1 was impregnated in an ethyl acetate solution, in which LiTFSI (available from Sigma) was dissolved, for 24 hours. The film was taken from the solution and dried in a 60° C.

Example 9: Stretchable Polymer Electrolyte Including 2 wt % of Silica and 27 wt % of Lithium Salt A stretchable polymer electrolyte was prepared in the same manner as in Example 5, except that the stretchable copolymer film including 2 wt % of silica prepared in Example 3 was used.

Example 10: Stretchable Polymer Electrolyte Including 2 wt % of Silica and 14 wt % of Lithium Salt A stretchable polymer electrolyte was prepared in the same manner as in Example 9, except that an amount of the LiTFSI lithium salt was changed to 14 wt %.

Example 11: Stretchable Polymer Electrolyte Including 3 wt % of Silica and 27 wt % of Lithium Salt A stretchable polymer electrolyte was prepared in the same manner as in Example 5, except that the stretchable copolymer film including 3 wt % of silica prepared in Example 4 was used.

Example 12: Stretchable Polymer Electrolyte Including 3 wt % of Silica and 14 wt % of Lithium Salt A stretchable polymer electrolyte was prepared in the same manner as in Example 11, except that an amount of the LiTFSI lithium salt was changed to 14 wt %.

Example 13: Stretchable Positive Electrode 100 parts by weight of JEFFAMINE D400 (available from Huntsman), as a chain extender, and 68 parts by weight of an adipic acid (available from Sigma), as a first monomer, were mixed to prepare a mixture. The mixture was heated at 150° C. for 10 minutes to prepare a first prepolymer. 98 parts by weight of JEFFAMINE T403 (available from Huntsman), as a second monomer, per 100 parts by weight of JEFFAMINE D400 (available from Huntsman) was added to the first prepolymer, 2 wt % of silica ($SiO_2$ having an average particle diameter of 14 nm) was added thereto, and the resultant was stirred at 150° C. for 10 minutes to prepare a second prepolymer having a homogenous composition.

$LiFePO_4$ (available from MTI Corporation) and single-walled nanotubes (P2-SWNT, available from Carbon Solutions Inc.), as a carbon conducting agent, were dissolved in N-methylpyrrolidone (at a ratio of 0.1 g per 100 μL of NMP) to prepare a mixture, and the mixture was added to the second prepolymer to prepare a slurry.

The slurry was cast on a polytetrafluoroethylene (PTFE) block, crosslinked and dried in vacuum at 150° C. for 24 hours, and then separated from the PTFE block to prepare a stretchable positive electrode.

In the stretchable positive electrode, an amount of $LiFePO_4$ was 35 wt %, an amount of single-walled nanotubes (P2-SWNT, available from Carbon Solutions Inc.), as a carbon conducting agent, was 5 wt %, and an amount of a stretchable copolymer (binder) was 60 wt %.

Example 14: Preparation of Lithium Battery Including Stretchable Polymer Electrolyte Preparation of Rigid Positive Electrode $LiFePO_4$ (available from MTI Corporation), Carbon Black (available from MTI Corporation) as a carbon conducting agent, and polyvinylidene fluoride (PVdF, available from MTI Corporation) were mixed at a weight ratio of 90:5:5 to prepare a mixture, and the mixture was mixed with N-methylpyrrolidone (NMP) in an agate mortar to prepare a slurry. The slurry was bar-coated on an aluminum foil current collector and dried once at 70° C. to prepare a positive electrode. The positive electrode was impregnated in an electrolyte, which was a solution prepared by dissolving 1 M of lithium bis(trifluoromethane sulphonyl) imide ($LiN(SO_2CF_3)_2$, LiTFSI) in a solvent mixture including 1,3-dioxolane (1,3-DOL) and dimethoxyethane (DME) (at a volume ratio of 1,3-DOL:DME=1:1), and was used in preparation of a coin cell.

Preparation of Coin Cell

The positive electrode prepared as described above was used as a positive electrode plate, a lithium metal foil was used as a counter electrode, and the stretchable polymer electrolyte prepared in Example 2 was disposed between the positive electrode plate and the counter electrode to prepare a 2032 coin cell. The whole cell preparation process was performed in a glove box of an Ar atmosphere.

Example 15: Preparation of Lithium Battery Including Stretchable Positive Electrode Preparation of Coin Cell The stretchable positive electrode prepared in Example 3 as an electrode, a lithium metal foil was used as a counter electrode, CELGARD 2250 was used as a separator, and a solution prepared by dissolving 1 M of LiTFSI in a solvent mixture including 1,3-DOL and DME at a volume ratio of 1:1 was used as an electrolyte, to prepare a 2032 coin cell.

Evaluation Example 1: Evaluation of Mechanical Properties of Stretchable Polymer Elongations at break and tensile moduli (or Young's moduli) of the stretchable polymers prepared in Example 1 and Comparative Example 1 were measured by using Universal Test Machine (Intron 5565), and some of the results are shown in Table 1 and FIG. 1.

TABLE 1

|  | Elongation at break [%] | Tensile modulus [MPa] |
| --- | --- | --- |
| Example 1 | 500 | 0.16 |
| Comparative Example 1 | 250 | 0.92 |

As shown in Table 1 and FIG. 1, the stretchable copolymer of Example 1 further included the first repeating unit including a chain extender (or an extended linker) compared to the stretchable copolymer of Comparative Example 1, and thus the stretchable copolymer of Example 1 had a significantly increased elongation at break and a decreased tensile modulus, which resulted significant increase in flexibility of the stretchable polymer of Example 1. It is deemed that flexibility of the stretchable copolymer increased as a crosslinking density of the stretchable copolymer decreased due to an increase of the molecular weight of the linear chain between crosslinks in the stretchable copolymer of Example 1.

Evaluation Example 2: Evaluation of Mechanical Properties of Stretchable Polymer Electrolyte Elongations at break of the stretchable polymer electrolytes prepared in Examples 5 and 9 were measured by using Universal Test Machine (Intron 5565) at a strain rate of 100%/min, and some of the results are shown in Table 2 and FIG. 2. The elongations are calculated as defined in Equation 1:

$$\text{Elongation at break (\%)} = [(L_f - L_0)/L_0] \times 100\% \quad \text{Equation 1}$$

In Equation 1, $L_f$ indicates a length of a sample at break, and $L_0$ indicates an initial length of the sample.

TABLE 2

|  | Elongation at break [%] |
|---|---|
| Example 5 | 225 |
| Example 9 | 130 |

Figure 2:
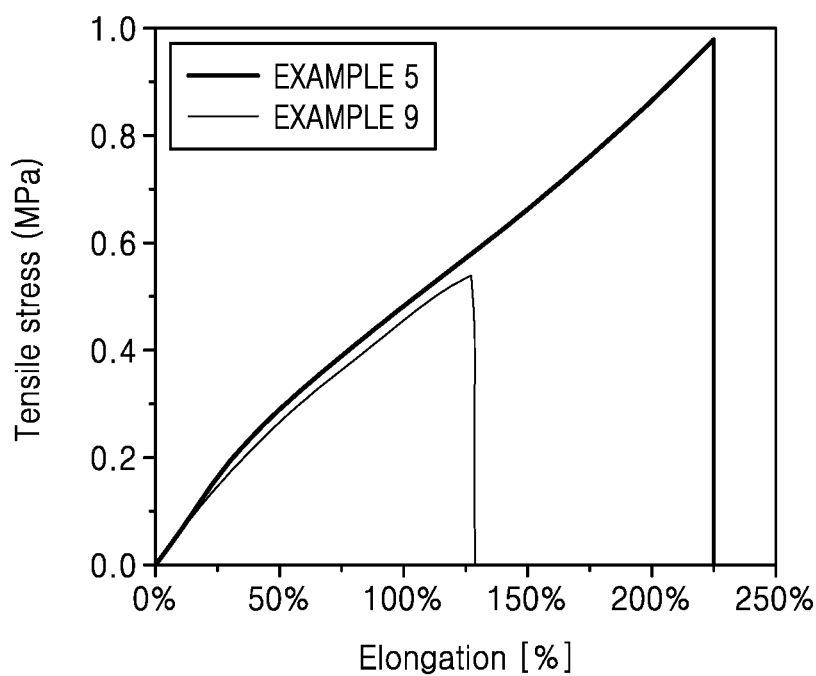
FIG. 2 is a graph of tensile stress (MPa) versus elongation (%) and shows a stress-strain curve of stretchable copolymer electrolytes prepared in Example 5 and Example 9.

As shown in Table 2 and FIG. 2, the stretchable polymer electrolytes of Examples 5 and 9 both had high elongations at break of about 130% or greater. Also, since the stretchable polymer electrolytes of Examples 5 and 9 were highly elastic, the stretchable polymer electrolytes were recovered to almost the original state after being elongated.

Evaluation Example 3: Evaluation of Mechanical Properties of Stretchable Positive Electrode An elongation at break of the positive electrode prepared in Example 13 was measured by using Universal Test Machine (Intron 5565) at a strain rate of 100%/min, and some of the results are shown in Table 3 and FIG. 3.

TABLE 3

|  | Elongation at break [%] |
|---|---|
| Example 13 | 66 |

Figure 3:
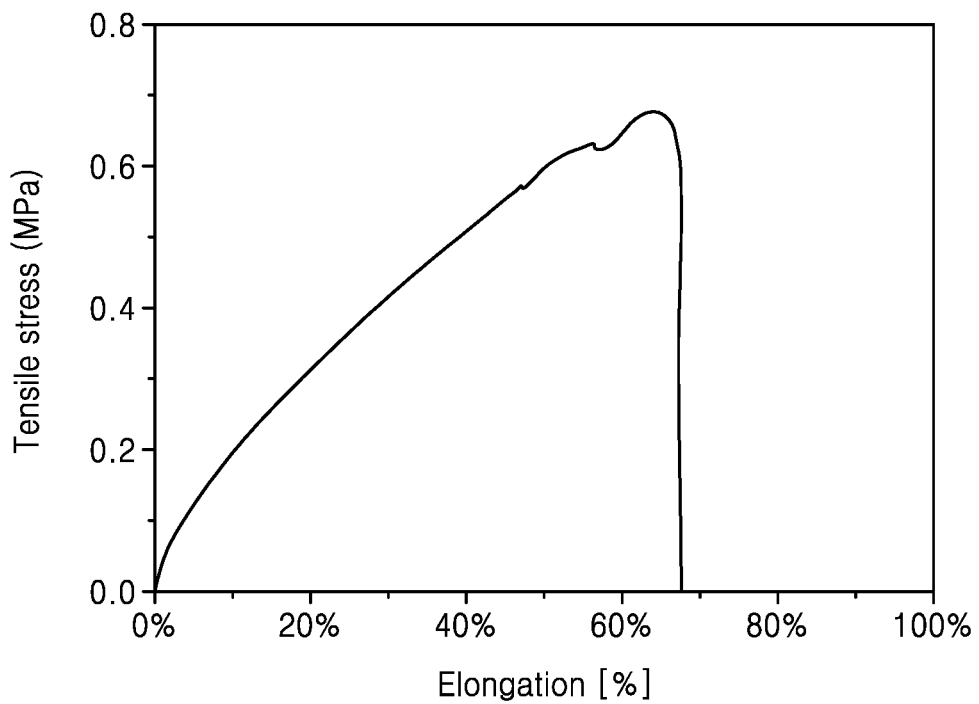
FIG. 3 is a graph of tensile stress (MPa) versus elongation (%) stress-strain curve of a stretchable polymer electrolyte prepared in Example 13.

As shown in Table 3 and FIG. 3, the stretchable positive electrode of Example 13 had a high elongation at break of about 60% or greater.

Evaluation Example 4: Measurement of Ion Conductivity of Stretchable Polymer Electrolyte Ion conductivities of the stretchable polymer electrolytes prepared in Examples 5 to 12 were measured by using an electrochemical impedance spectroscopy (EIS). The ion conductivities were measured by using a current having an amplitude of 50 mV within a frequency band of 1 MHz to 100 MHz by using a VSP potentionstat (available from BioLogic Science Instruments, USA). In the measurement, a 2032 coin cell having stainless steel (SS) discs disposed on both surfaces of the stretchable polymer electrolyte (SS | ePPO | SS) was used, wherein ePPO is the stretchable polymer electrolyte. The results of the measurement are shown in FIGS. 4 and 5.

Figure 4:
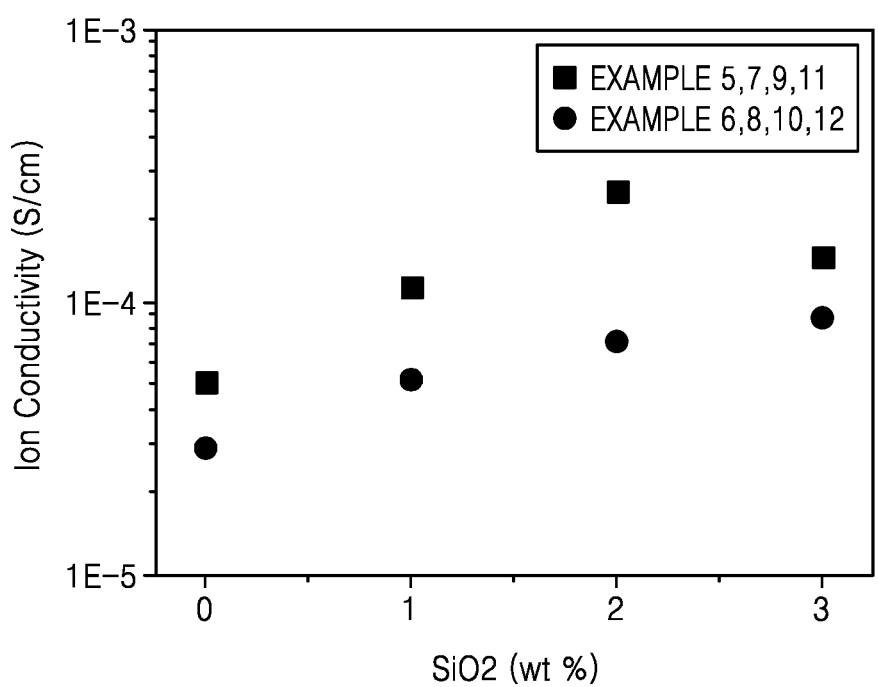
FIG. 4 is a graph of ion conductivity (Siemens per centimeter, S/cm) versus amount of $SiO_2$ (weight percent, wt %) and shows the results of measuring ion conductivities of stretchable polymer electrolytes prepared in Examples 5 to 12.

FIG. 4 is a graph that shows ion conductivity of a stretchable polymer electrolyte according to an amount of lithium salt and an amount of silica at 30° C.

Figure 5:
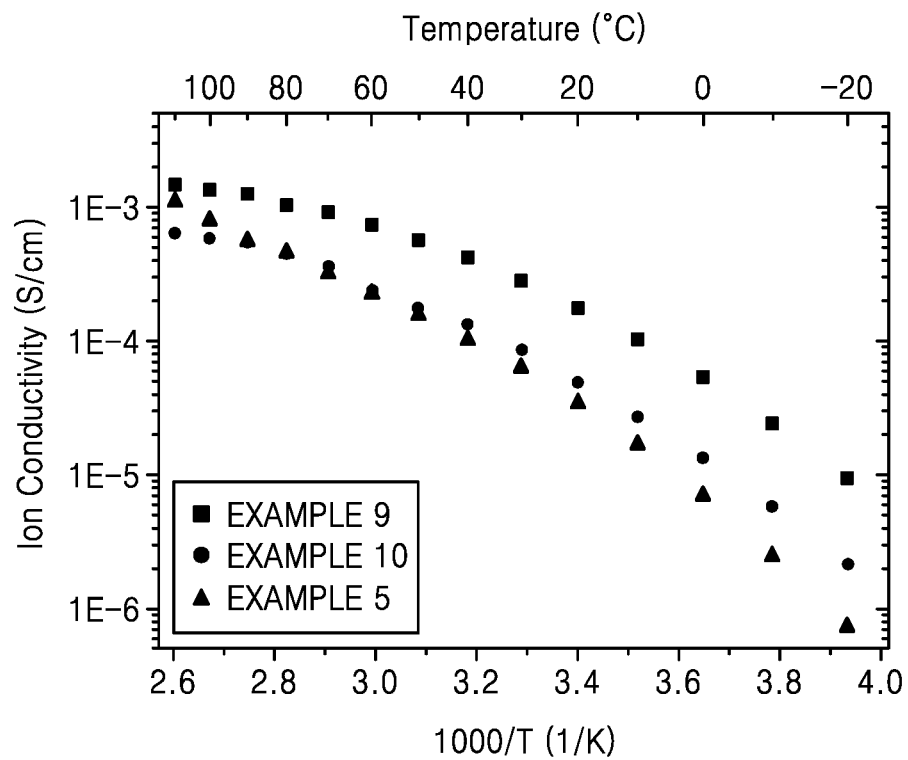
FIG. 5 is a graph of ion conductivity (S/cm) versus inverse temperature (1/K) and shows the results of measuring ion conductivities of stretchable polymer electrolytes prepared in Examples 5, 9, and 10 according to a temperature.

As shown in FIGS. 4 and 5, an ion conductivity of the stretchable polymer electrolyte increased by adding silica. The ion conductivity of the stretchable polymer electrolyte at 30° C. was about $2 \times 10^{-5}$ S/cm or greater.

As shown in FIG. 4, the stretchable polymer electrolyte of Example 9 had a high ion conductivity of about $2.5 \times 10^{-4}$ S/cm. The ion conductivity is at a level similar to an ion conductivity of an electrolyte layer obtained by impregnating a conventional polyethylene porous separator in a liquid electrolyte.

Evaluation Example 5: Evaluation of Charge/Discharge Characteristics

A lithium battery (a coin cell) including the stretchable polymer electrolyte prepared in Example 14 was charged at 25° C. with a constant current of 0.1 C rate until a voltage was 4.0 V (vs. Li). Once the charging was completed, the coin cell had a resting period of 10 minutes and then discharged with a constant current of 0.1 C rate until a voltage was 2.5 V (vs. Li) (1st cycle of a formation process).

The coin cell underwent the formation process was charged at 25° C. with a constant current of 0.2 C rate until a voltage was 4.0 V (vs. Li). Once the charging was completed, the coin cell had a resting period of 10 minutes and then discharged with a constant current of 0.2 C rate until a voltage was 2.5 V (vs. Li), and this cycle was repeated 200 times. Some of the results of the charge/discharge test are shown in Table 4 and FIG. 6. A capacity retention ratio was calculated as defined in Equation 2.

$$\text{Capacity retention ratio [\%]} = [\text{Discharge capacity at } 200^{th} \text{ cycle/discharge capacity at } 1^{st} \text{ cycle}] \times 100\% \quad \text{Equation 2}$$

TABLE 4

|  | Capacity retention ratio [%] |
|---|---|
| Example 14 | 95.4 |

As shown in Table 4, the lithium battery of Example 14 had an excellent capacity retention ratio after a long period of charge/discharge process.

Figure 6:
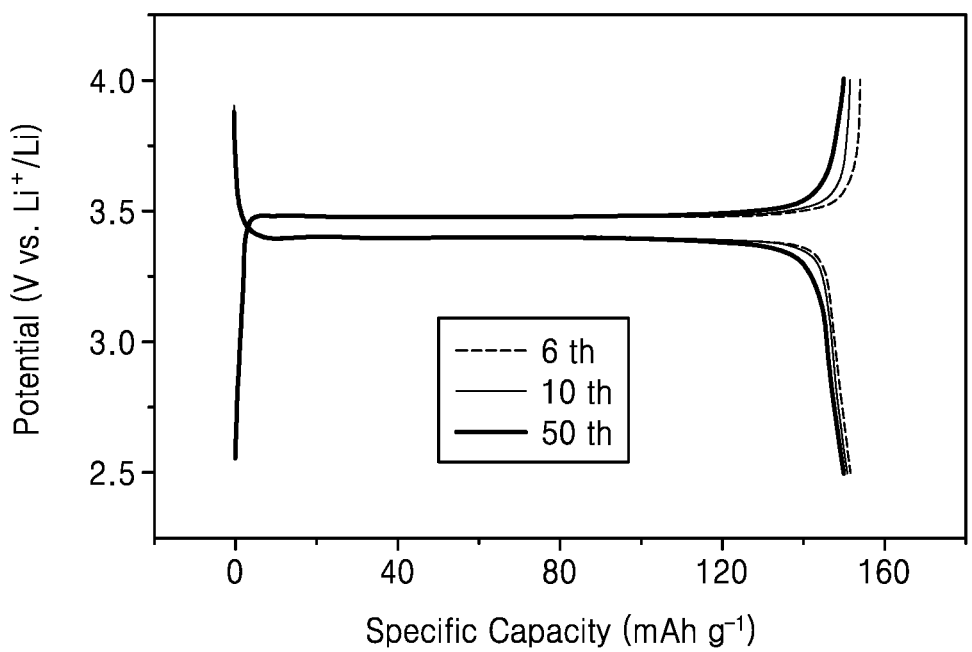
FIG. 6 is a graph of potential (volts, V vs. Li) versus specific capacity (milliamperehours per gram, mAh/g) and shows the charge/discharge profiles of the 6th, 10th, and 50th cycles of a coin cell lithium battery prepared in Example 14.

As shown in FIG. 6, the lithium battery of Example 14 exhibited a flat and similar charge/discharge profile regardless of the number of charge/discharge cycles.

Evaluation Example 6: Cyclic Voltammetry Measurement

Reversibility of an electrode reaction and occurrence of a side reaction of the lithium battery (a coin cell) including the stretchable polymer electrolyte of Example 14 were evaluated at 25° C. by using a cyclic voltammetry method using a VMP3 potentionstat (available from BioLogic Science Instruments, USA). A potential scanning rate was 0.25 millivolts per second (mV/s). The results of the measurement are shown in FIG. 7.

Figure 7:
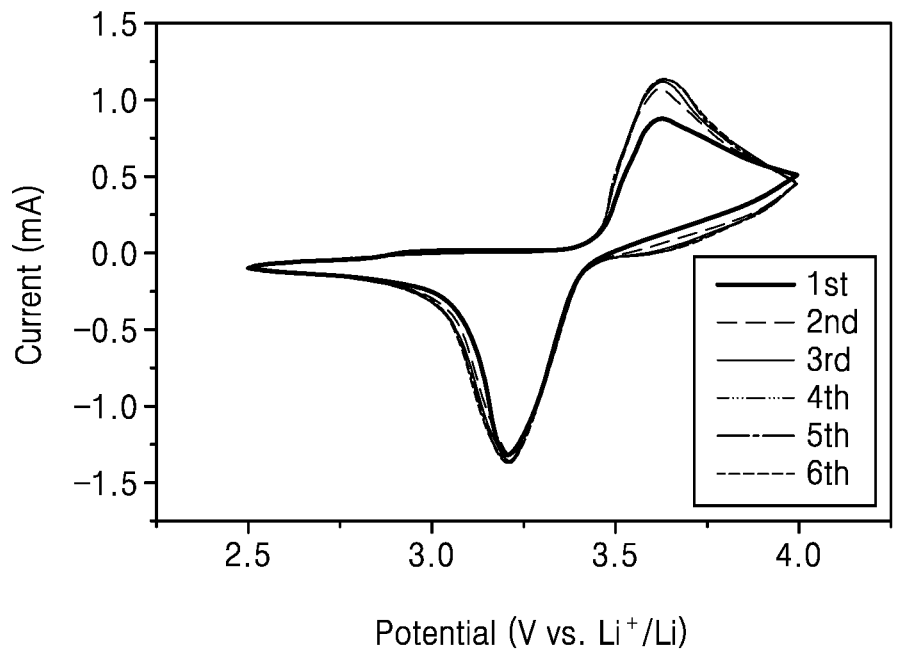
FIG. 7 is a graph of current (milliamperes, mA) versus potential (V) and shows a cyclic voltammetry graph of the coin cell lithium battery prepared in Example 14.

As shown in FIG. 7, positions of the oxidation-reduction peak and amounts of the current in the repeated scanning were similar, and thus it was confirmed that the reversible electrode reaction underwent, and a side reaction did not occur.

Evaluation Example 7: Evaluation of Charge/Discharge Characteristics

A lithium battery (a coin cell) including the stretchable positive electrode prepared in Example 15 was charged at 25° C. with a constant current of 0.1 C rate until a voltage was 4.0 V (vs. Li). Once the charging was completed, the coin cell had a resting period of 10 minutes and then discharged with a constant current of 0.1 C rate until a voltage was 2.5 V (vs. Li) (1st cycle of a formation process).

The coin cell underwent the formation process was charged at 25° C. with a constant current of 0.2 C rate until a voltage was 4.0 V (vs. Li). Once the charging was completed, the coin cell had a resting period of 10 minutes and then discharged with a constant current of 0.2 C rate until a voltage was 2.5 V (vs. Li), and this cycle was repeated 200 times. Some of the results of the charge/discharge test are shown in Table 5 and FIG. 8. A capacity retention ratio was calculated as defined in Equation 2.

Capacity retention ratio [%]=[Discharge capacity at $200^{th}$ cycle/discharge capacity at $1^{st}$ cycle]× 100%  Equation 2

TABLE 5

|  | Capacity retention ratio [%] |
| --- | --- |
| Example 15 | 86.1 |

As shown in Table 5, the lithium battery of Example 15 had an excellent capacity retention ratio after a long period of charge/discharge process.

Figure 8:
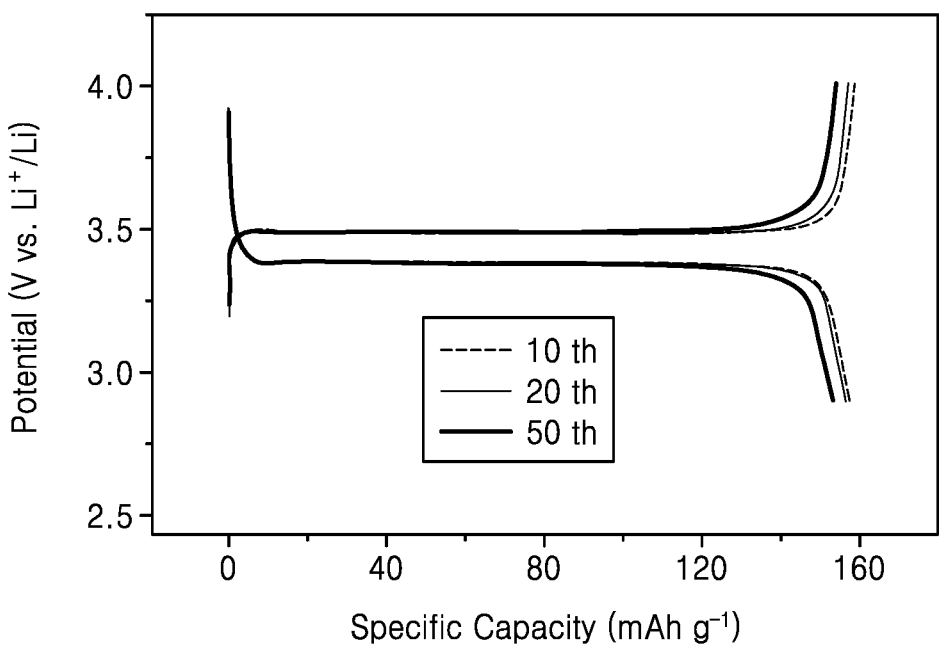
FIG. 8 is a graph of potential (V) versus specific capacity (mAh/g) and shows charge/discharge profiles of the 10th, 20th, and 50th cycles of the coin cell lithium battery prepared in Example 14.

As shown in FIG. 8, the lithium battery of Example 15 exhibited a flat and similar charge/discharge profile regardless of the number of charge/discharge cycles.

As described above, according to one or more embodiments, elongations of a stretchable polymer electrolyte and a stretchable electrode may improve by including a stretchable polymer including a non-crosslinked repeating unit and a crosslinked repeating unit. Also, a lithium battery including the stretchable polymer electrolyte or the stretchable electrode may have excellent cycle characteristics.

It should be understood that embodiments described herein should be considered in a descriptive sense and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A stretchable polymer electrolyte comprising:
a stretchable copolymer;
a lithium salt; and
an organic liquid,
wherein the stretchable copolymer comprises a non-crosslinked first repeating unit, a non-crosslinked second repeating unit, and a crosslinked third repeating unit;
the first repeating unit comprises a first hard segment and a first soft segment;
the second repeating unit comprises a second hard segment and a second soft segment; and
the third repeating unit comprises a third hard segment and a third soft segment.

2. The stretchable polymer electrolyte of claim 1, wherein the first hard segment, the second hard segment, and the third hard segment each independently comprises at least one bond selected from an amide bond, a urea bond, a urethane bond, and an imide bond.

3. The stretchable polymer electrolyte of claim 1, wherein the first soft segment and the second soft segment each comprise a non-crosslinked poly(C1-C20 alkylene oxide) chain, and the third soft segment comprises a crosslinked poly(C1-C20 alkylene oxide) chain.

4. The stretchable polymer electrolyte of claim 1, wherein the first repeating unit is represented by Formula 1:

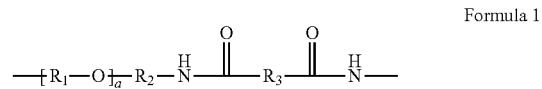

Formula 1 wherein, in Formula 1,
$R_1$, $R_2$, and $R_3$ are each independently a divalent linking group, wherein the divalent linking group comprises a linear or branched C2-C10 alkylene group substituted or not substituted with a halogen, a C6-C10 arylene group substituted or not substituted with a halogen, a C2-C10 heteroarylene group substituted or not substituted with a halogen, or a combination thereof; and
a is an integer of 2 to 20.

5. The stretchable polymer electrolyte of claim 1, wherein the second repeating unit is represented by Formula 2, and the third repeating unit is represented by Formula 3:

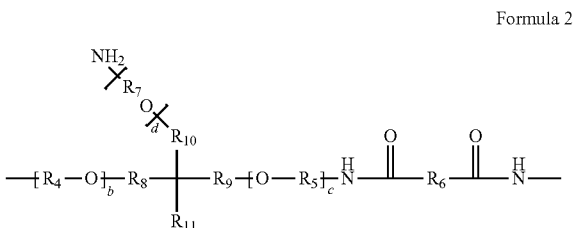

Formula 2

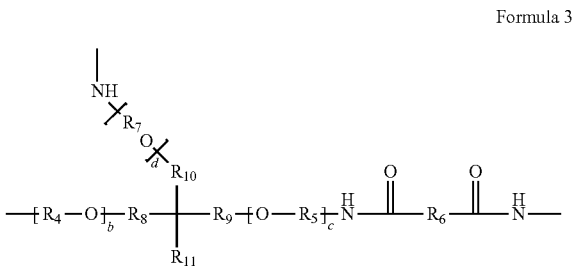

Formula 3 wherein, in Formulae 2 and 3,
each $R_4$, $R_5$, $R_6$, $R_7$, $R_8$, $R_9$, and $R_{10}$ are the same or different, and are each independently a divalent linking group, wherein the divalent linking group comprises a linear or branched C2-C10 alkylene group substituted or not substituted with a halogen, a C6-C10 arylene group substituted or not substituted with a halogen, a C2-C10 heteroarylene group substituted or not substituted with a halogen, or a combination thereof;
each $R_{11}$ is the same or different, and is a monovalent group, wherein the monovalent group comprises a linear or branched C1-C10 alkyl group substituted or not substituted with a halogen, a C2-C10 alkenyl group substituted or not substituted with a halogen, a C2-C10 alkynyl group substituted or not substituted with a halogen, a C6-C10 cycloalkyl group substituted or not substituted with a halogen, a C6-C10 aryl group substituted or not substituted with a halogen, a C2-C10 heteroaryl group substituted or not substituted with a halogen, or a combination thereof; and
b, c, and d are each independently an integer of 2 to 20.

6. The stretchable polymer electrolyte of claim 1, wherein the stretchable copolymer is represented by Formula 4:

Formula 4

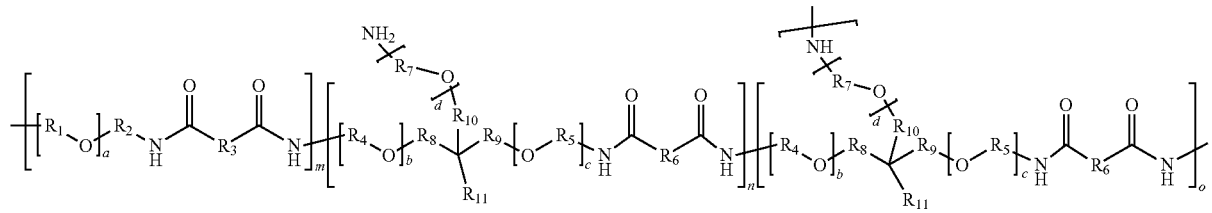

wherein, in Formula 4, each $R_1$, $R_2$, $R_3$, $R_4$, $R_5$, $R_6$, $R_7$, $R_8$, $R_9$, and $R_{10}$ are the same or different, and are each independently a divalent linking group, wherein the divalent linking group comprises a linear or branched C2-C10 alkylene group substituted or not substituted with a halogen, a C6-C10 arylene group substituted or not substituted with a halogen, a C2-C10 heteroarylene group substituted or not substituted with a halogen, or a combination thereof;

each $R_{11}$ is the same or different, and is a monovalent group, wherein the monovalent group comprises a linear or branched C1-C10 alkyl group substituted or not substituted with a halogen, a C2-C10 alkenyl group substituted or not substituted with a halogen, a C2-C10 alkynyl group substituted or not substituted with a halogen, a C6-C10 cycloalkyl group substituted or not substituted with a halogen, a C6-C10 aryl group substituted or not substituted with a halogen, a C2-C10 heteroaryl group substituted or not substituted with a halogen, or a combination thereof;

a, b, c, and d are each independently an integer of 2 to 20; and m, n, and o are molar fractions that satisfy $0<m<1$, $0<n<1$, $0<o<1$, and $m+n+o=1$, and a molar ratio n:o is in a range of about 9:1 to about 5:5.

7. The stretchable polymer electrolyte of claim 1, wherein the stretchable copolymer is represented by at least one of Formulae 5 and 6:

Formula 5

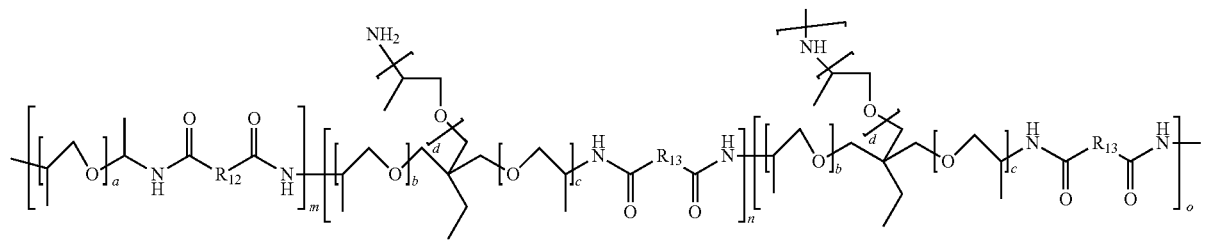

Formula 6

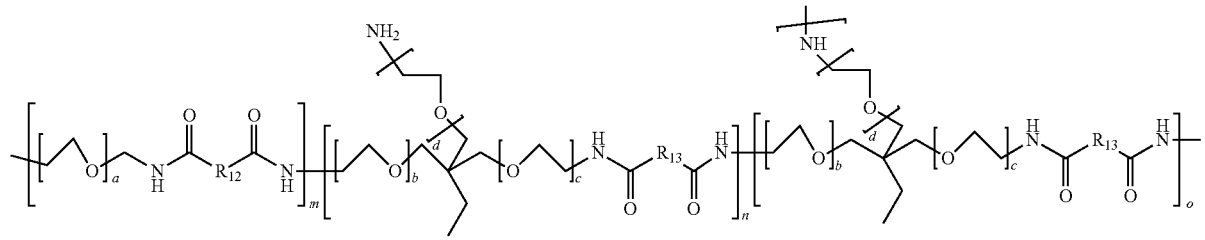

wherein, in Formulae 5 and 6, each $R_{12}$ and $R_{13}$ are the same or different, and are each independently a divalent linking group, wherein the divalent linking group comprises a linear or branched C2-C10 alkylene group substituted or not substituted with a halogen, a C6-C10 arylene group substituted or not substituted with a halogen, or a combination thereof;

a, b, c, and d are each independently an integer of 2 to 20; and m, n, and o are molar fractions that satisfy 0<m<1, 0<n<1, 0<o<1, and m+n+o=1, and a molar ratio n:o is in a range of about 9:1 to about 5:5.

8. The stretchable polymer electrolyte of claim 1, wherein the stretchable copolymer is represented by at least one of Formulae 7 and 8:

Formula 7

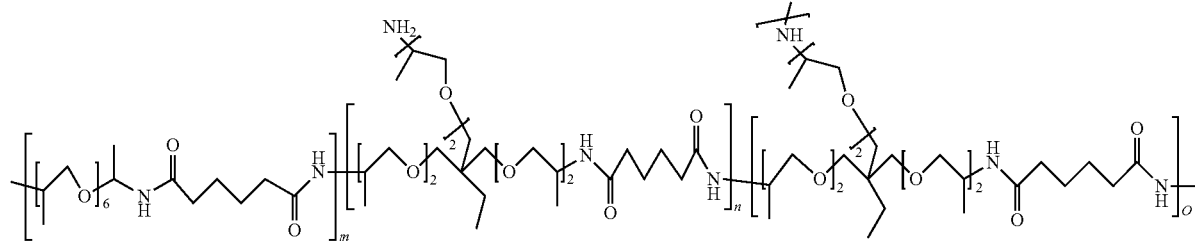

Formula 8

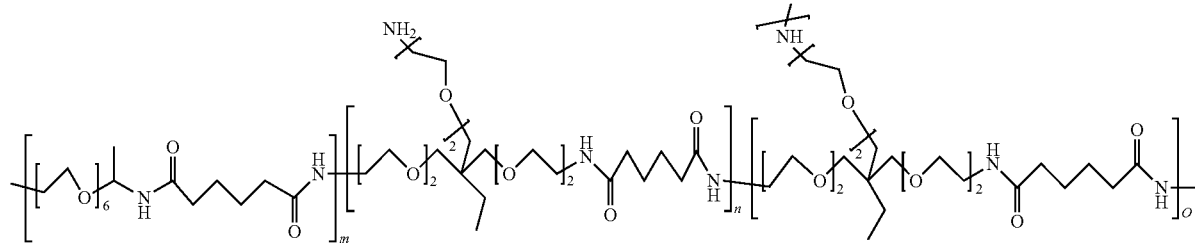

wherein, in Formulae 7 and 8, m, n, and o are molar fractions that satisfy 0<m<1, 0<n<1, 0<o<1, and m+n+o=1, and a molar ratio n:o is in a range of about 9:1 to about 5:5.

9. The stretchable polymer electrolyte of claim 1, wherein an amount of the lithium salt is in a range of about 1 part by weight to about 100 parts by weight based on 100 parts by weight of the stretchable copolymer.

10. The stretchable polymer electrolyte of claim 1, wherein the organic liquid comprises at least one of an organic solvent and an ionic liquid.

11. The stretchable polymer electrolyte of claim 10, wherein an amount of the organic liquid is in a range of about 1 part by weight to about 100 parts by weight based on 100 parts by weight of the stretchable copolymer.

12. The stretchable polymer electrolyte of claim 1, further comprising one or more inorganic particles.

13. The stretchable polymer electrolyte of claim 12, wherein the one or more inorganic particles comprise at least one of a metal oxide, a metal nitride, a metal nitrate, a metal carbide, a metal carbonate, a carbonaceous material, and an organic-inorganic composite.

14. The stretchable polymer electrolyte of claim 13, wherein an amount of the one or more inorganic particles is about 15 weight percent or less, based on a total weight of the stretchable copolymer and the one or more inorganic particles.

15. The stretchable polymer electrolyte of claim 1, wherein the stretchable polymer electrolyte has an elongation at break of about 50% or greater at room temperature, and an ion conductivity of about $1\times10^{-5}$ Siemens per centimeter or greater at 30° C.

16. An electrochemical device comprising the stretchable polymer electrolyte of claim 1.

17. The electrochemical device of claim 16, wherein the electrochemical device is a lithium battery, a capacitor, or an electrochromic device.

18. A method of preparing the stretchable polymer electrolyte of claim 1, the method comprising:
reacting a first monomer comprising at least two reactive terminal functional groups and a chain extender comprising an alkylene oxide repeating unit to prepare a first pre-copolymer;
combining the first pre-copolymer and a second monomer comprising a crosslinking terminal functional group to prepare a pre-copolymer composition; and
crosslinking the pre-copolymer composition to provide the stretchable copolymer.

* * * * *